United States Patent
Shibuya et al.

(10) Patent No.: US 7,777,789 B2
(45) Date of Patent: *Aug. 17, 2010

(54) INFORMATION MANAGEMENT APPARATUS DEFINING A REPLAY SEQUENCE OF NEW IMAGE DATA ADDED TO GROUPS OF IMAGES

(75) Inventors: Kazuyuki Shibuya, Sagamihara (JP); Shinya Kawasaki, Tokyo (JP)

(73) Assignee: Olympus Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/333,381

(22) Filed: Dec. 12, 2008

(65) Prior Publication Data

US 2009/0132922 A1    May 21, 2009

Related U.S. Application Data

(63) Continuation of application No. 11/102,261, filed on Apr. 8, 2005, now Pat. No. 7,616,235.

(30) Foreign Application Priority Data

Apr. 23, 2004    (JP)    .............................. 2004-128902

(51) Int. Cl.
*H04N 5/76*    (2006.01)
*H04N 5/222*    (2006.01)
*G06F 3/048*    (2006.01)

(52) U.S. Cl. .................. 348/231.2; 348/231.3; 715/838

(58) Field of Classification Search ............ 348/231.99, 348/231.2, 231.3, 231.6, 231.7, 333.05; 715/838

See application file for complete search history.

(56) References Cited

U.S. PATENT DOCUMENTS

| | | | |
|---|---|---|---|
| 4,717,971 A * | 1/1988 | Sawyer ......................... | 386/55 |
| 5,796,428 A * | 8/1998 | Matsumoto et al. .... | 348/207.99 |
| 6,028,603 A * | 2/2000 | Wang et al. ................. | 715/776 |
| 6,108,677 A | 8/2000 | Kiuchi et al. | |
| 6,522,354 B1 * | 2/2003 | Kawamura et al. ........ | 348/231.2 |
| 6,571,054 B1 | 5/2003 | Tonomura et al. .............. | 386/95 |
| 6,871,009 B1 * | 3/2005 | Suzuki ..................... | 348/231.2 |
| 6,964,025 B2 * | 11/2005 | Angiulo et al. ............. | 715/838 |
| 7,075,570 B2 * | 7/2006 | Nagaoka .................. | 348/231.2 |
| 7,076,503 B2 * | 7/2006 | Platt et al. ................ | 707/103 R |
| 7,084,916 B2 * | 8/2006 | Morimoto et al. ......... | 348/231.2 |
| 7,301,561 B2 * | 11/2007 | Ohmura .................... | 348/231.2 |
| 2002/0059322 A1 * | 5/2002 | Miyazaki et al. ............ | 707/200 |
| 2003/0011681 A1 * | 1/2003 | Ohmura .................... | 348/207.1 |
| 2003/0063198 A1 * | 4/2003 | Yokokawa ................ | 348/231.2 |
| 2004/0264810 A1 * | 12/2004 | Taugher et al. ............ | 348/231.2 |

FOREIGN PATENT DOCUMENTS

CN    1150670    5/1997

(Continued)

*Primary Examiner*—John M Villecco
(74) *Attorney, Agent, or Firm*—Ostrolenk Faber LLP

(57) ABSTRACT

An album list file stores album information relating to album containing image data files, and an album list storing sequence information indicating a replay sequence of image data files at the time of replaying the image data files belonging to the album. Here, when an album containing a new image data file which has not been included in the album is designated, the sequence information is renewed so as to replay the new image data file first at the time of replaying image data files contained by the designated album.

5 Claims, 32 Drawing Sheets

FOREIGN PATENT DOCUMENTS

| | | |
|---|---|---|
| JP | 08-137679 | 5/1996 |
| JP | 11-224266 | 8/1999 |
| JP | 2001-008149 | 1/2001 |
| JP | 2002209163 A * | 7/2002 |

* cited by examiner

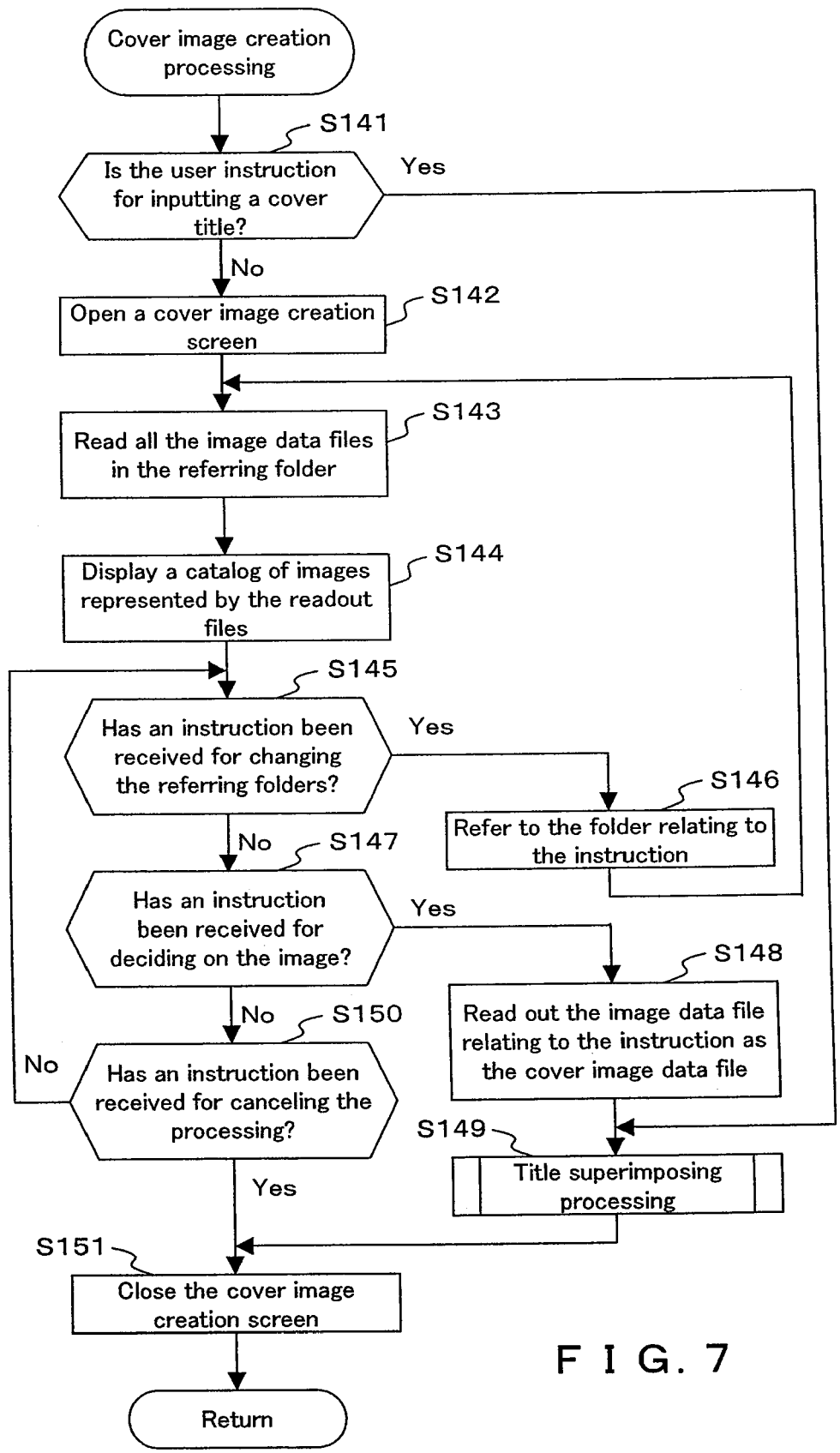
F I G. 7

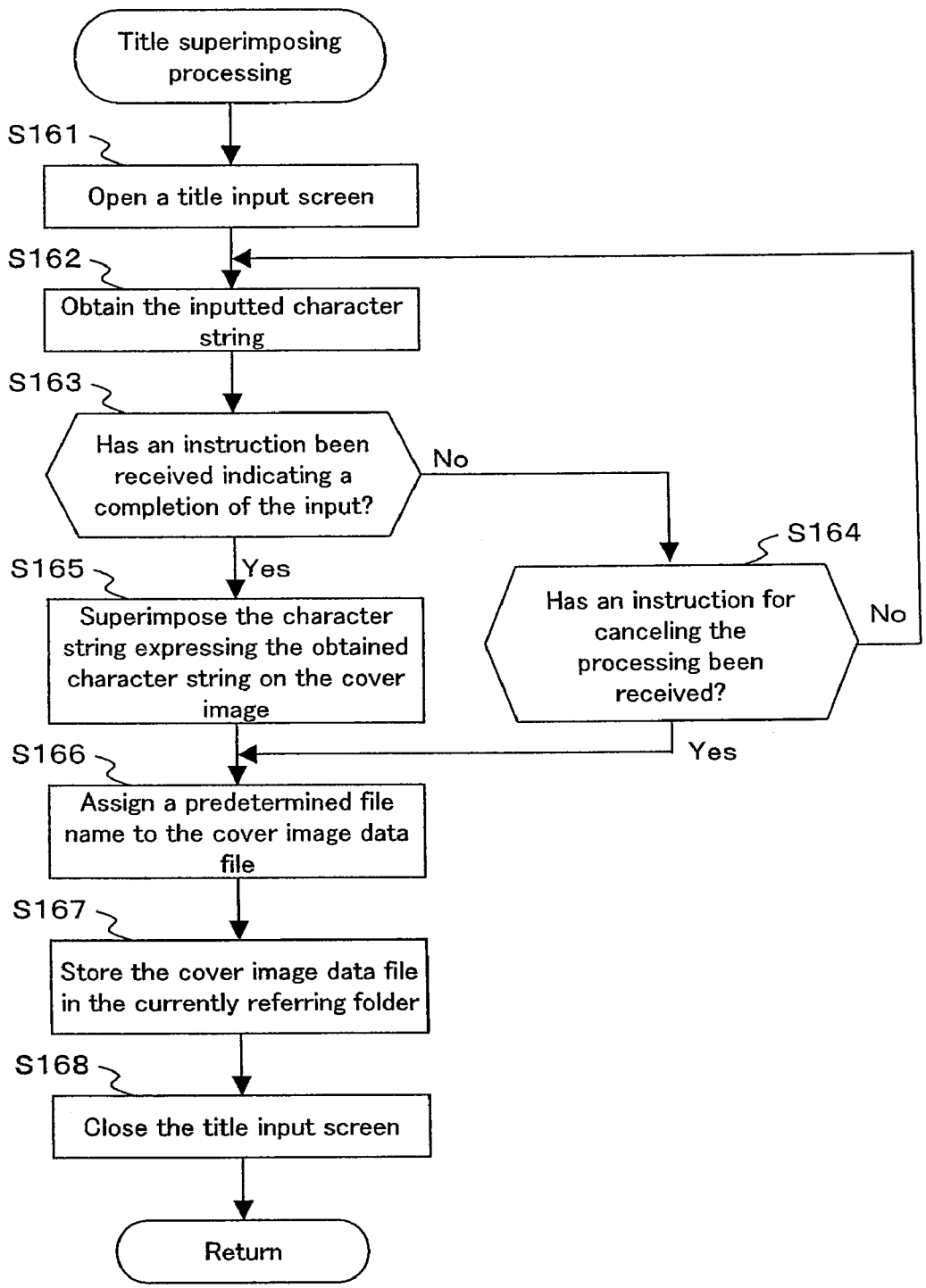
F I G. 9

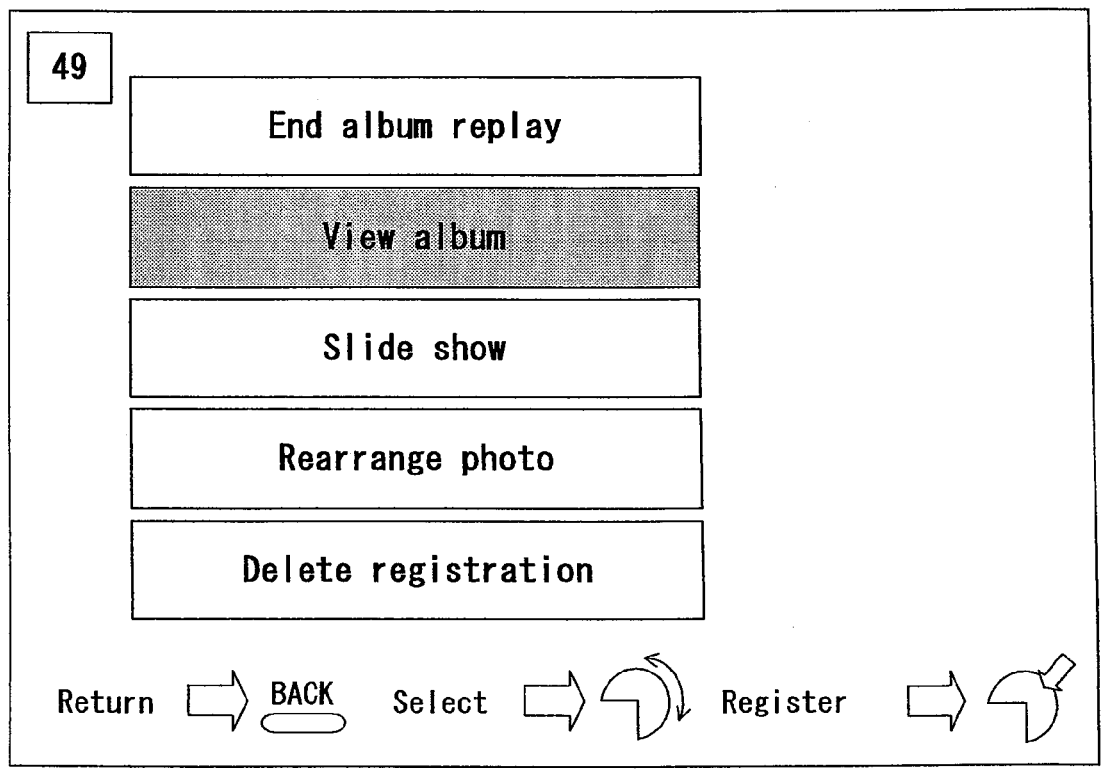
F I G. 1 4 A

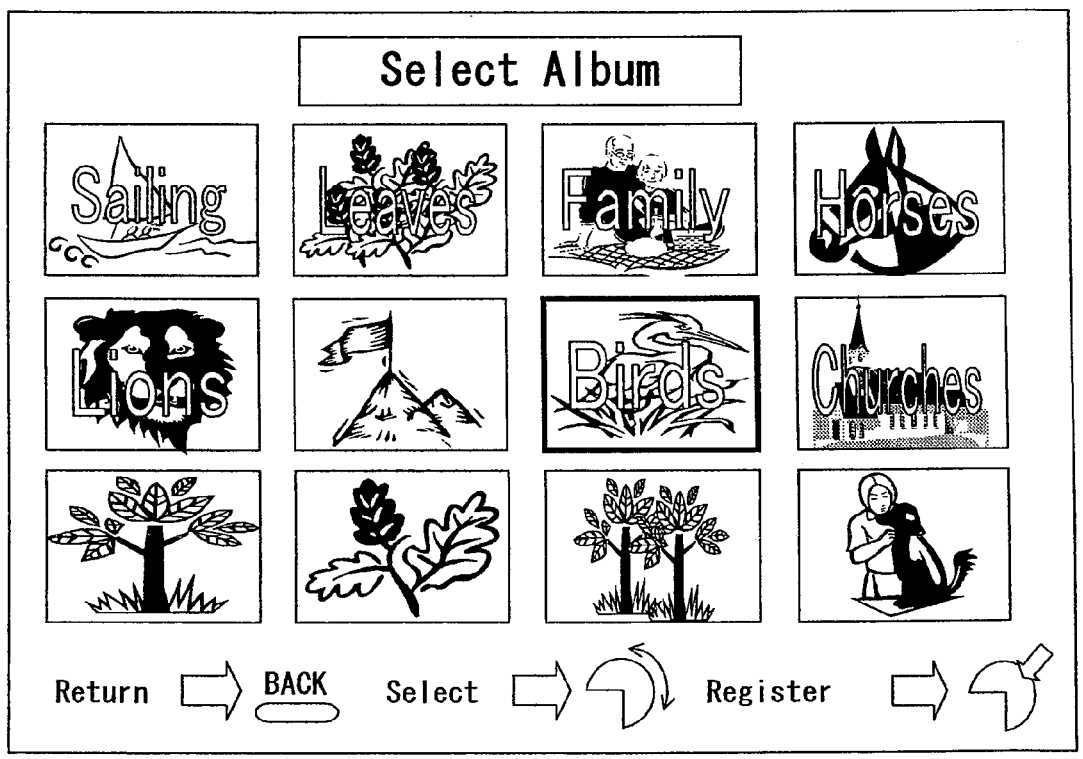
F I G. 1 4 B

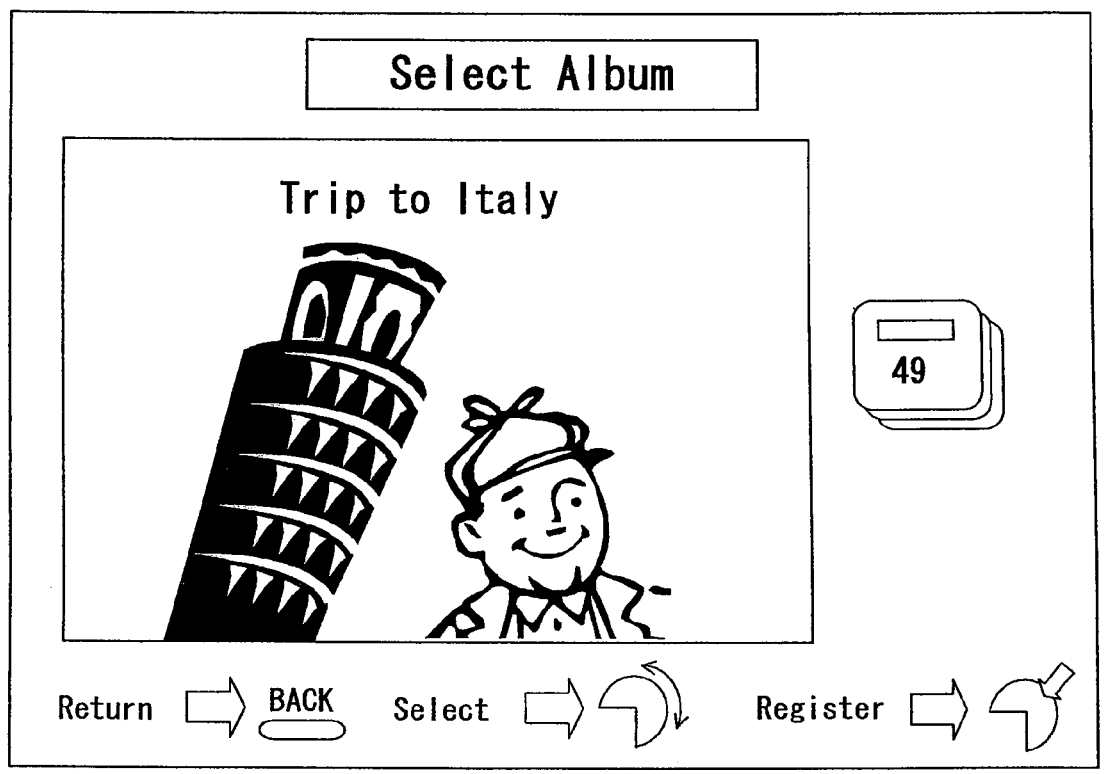
F I G. 1 4 C

FIG. 15A
| ALBUM1 | ALBUM2 | ALBUM3 |
|---|---|---|
| ... | DCIM/100OLYMP/P1010021.JPG | ... |
| ... | DCIM/100OLYMP/P1010006.JPG | ... |
| ... | DCIM/100OLYMP/P1010001.JPG | ... |
| ... | DCIM/100OLYMP/P1010004.JPG | ... |
|  |  |  |
FIG. 15B
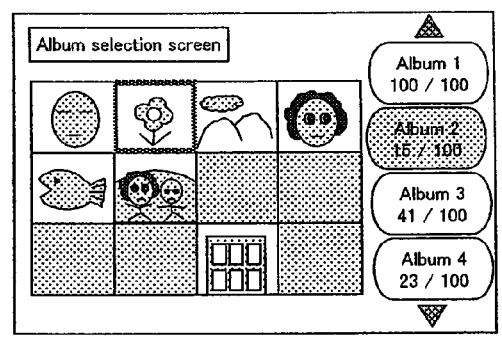
FIG. 15C
| ALBUM1 | ALBUM2 | ALBUM3 |
|---|---|---|
| ... | DCIM/100OLYMP/P1010078.JPG | ... |
| ... | DCIM/100OLYMP/P1010021.JPG | ... |
| ... | DCIM/100OLYMP/P1010006.JPG | ... |
| ... | DCIM/100OLYMP/P1010001.JPG | ... |
|  |  |  |
FIG. 15D
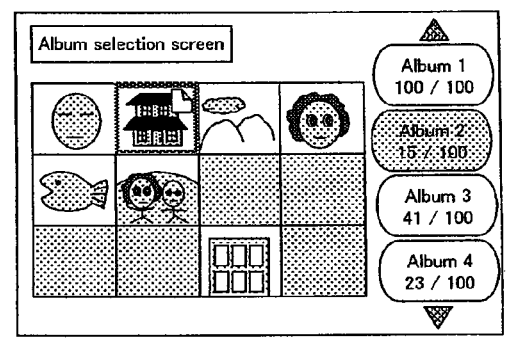
FIG. 15E
| | |
|---|---|
| 🌸 | DCIM/100OLYMP/P1010021.JPG |
| 🏠 | DCIM/100OLYMP/P1010078.JPG |
FIG. 15F
FIG. 15G
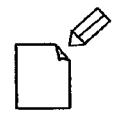
FIG. 15H

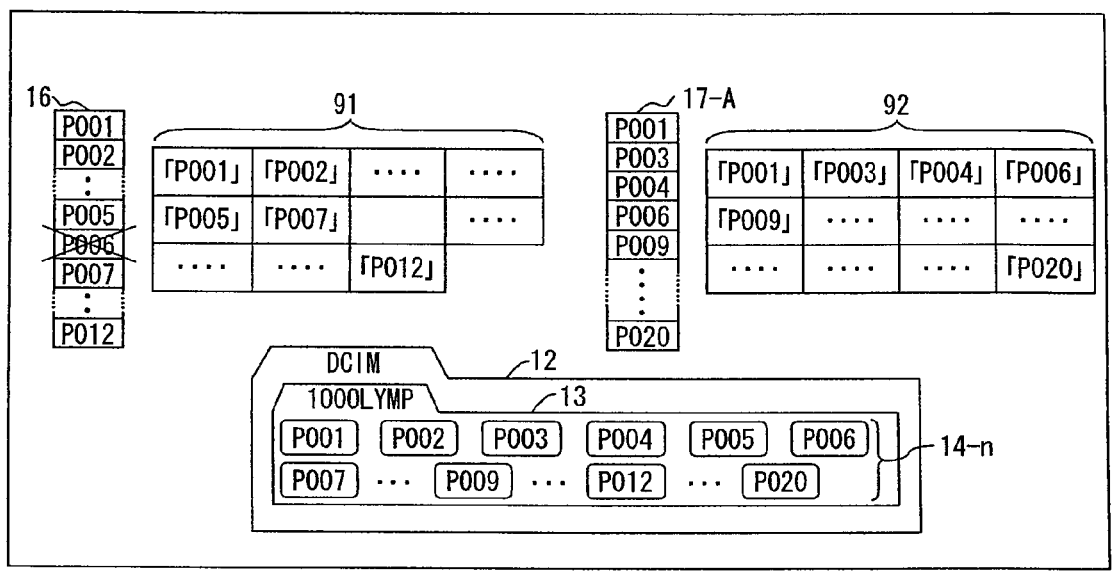
F I G. 2 0 B

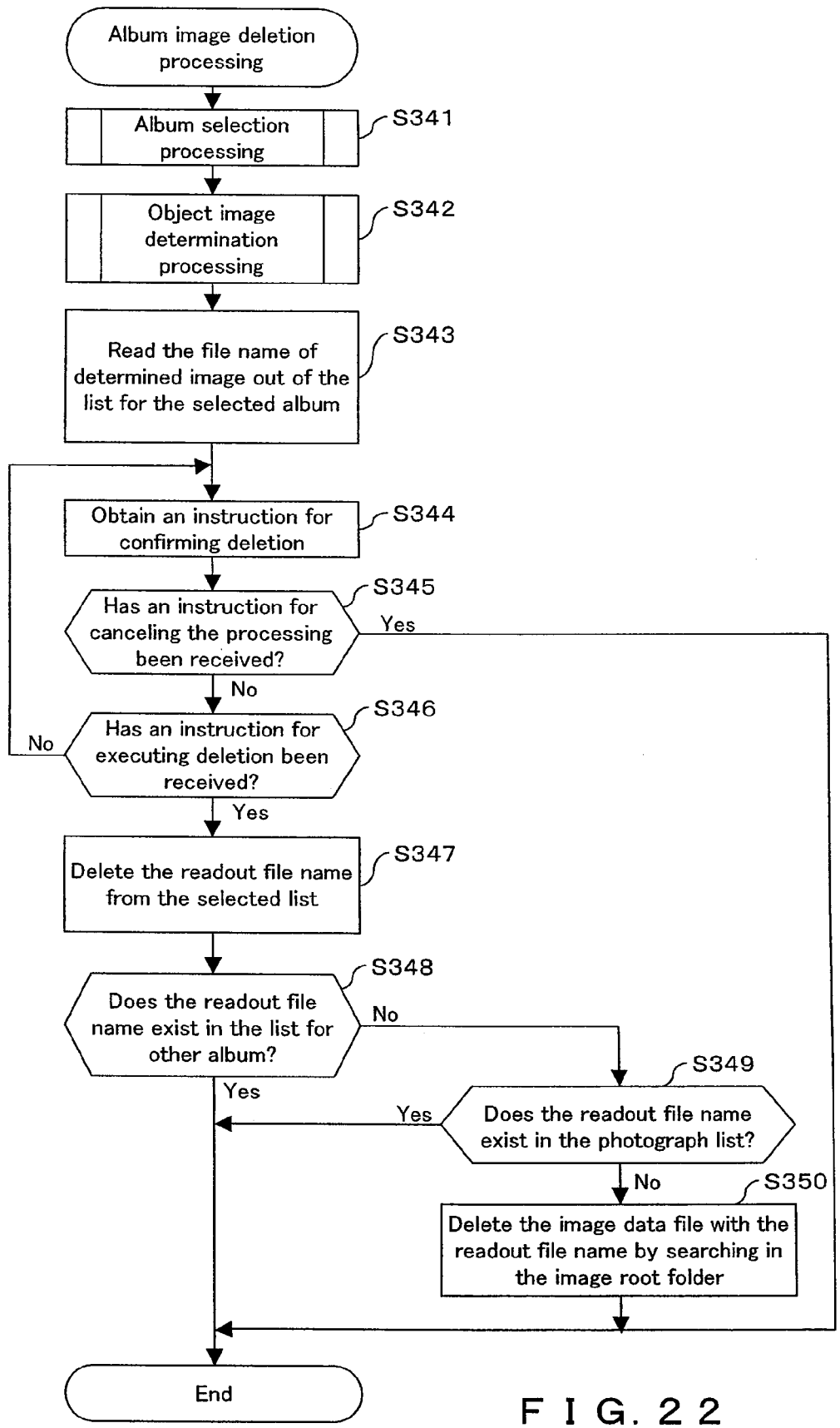
F I G. 2 2

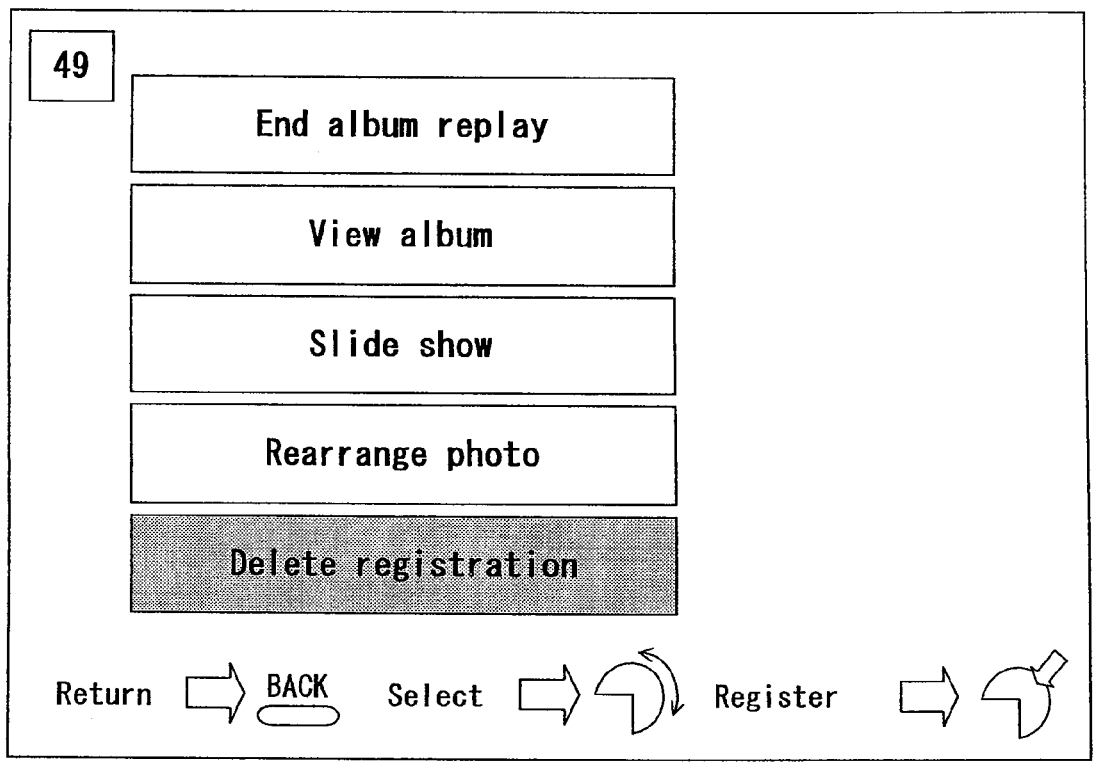
F I G. 2 3 A

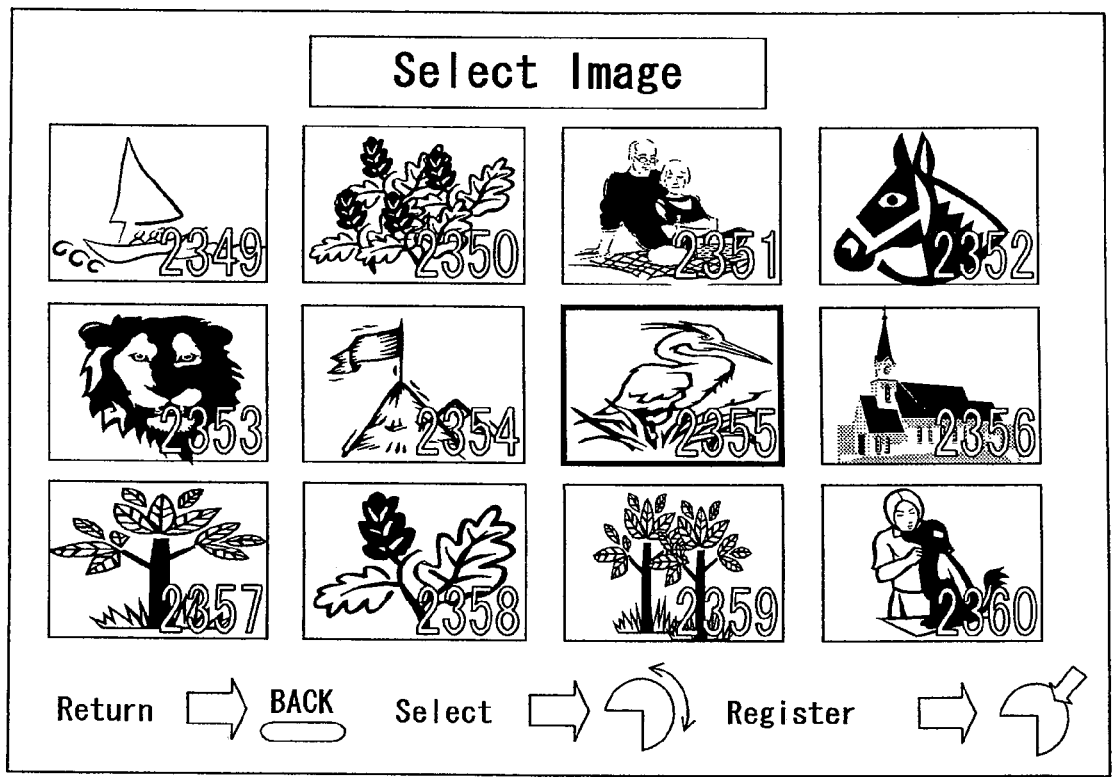
F I G. 2 3 B

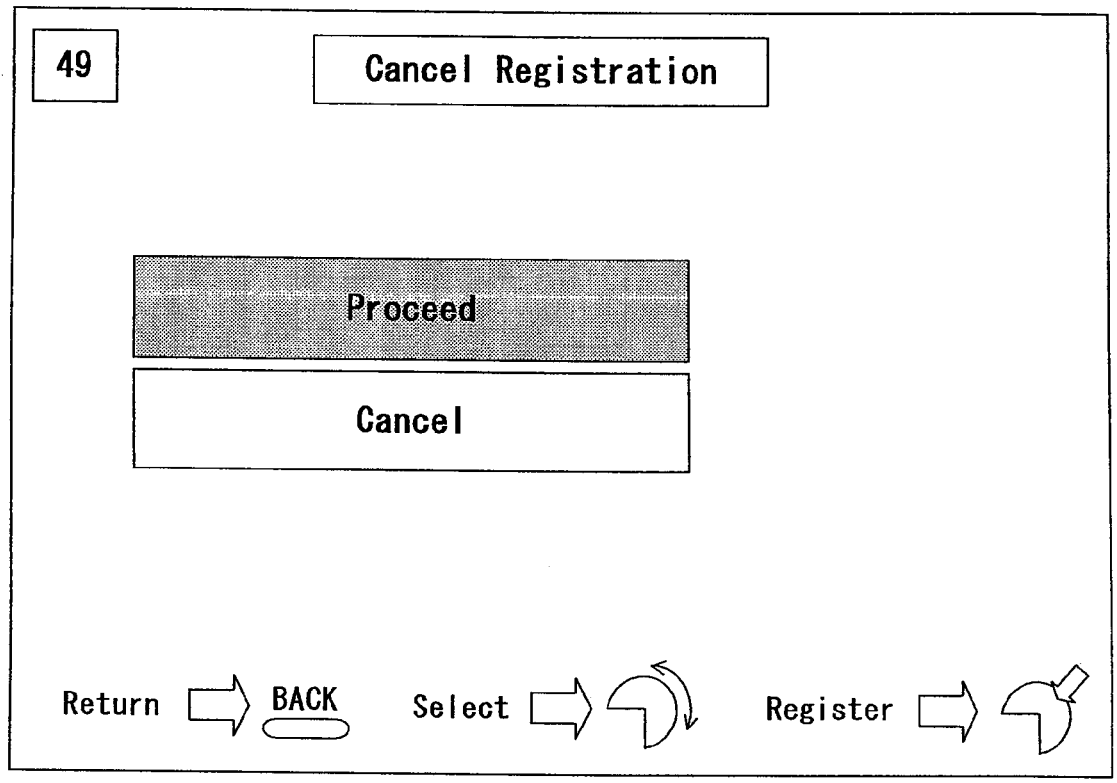
F I G. 2 3 E

INFORMATION MANAGEMENT APPARATUS DEFINING A REPLAY SEQUENCE OF NEW IMAGE DATA ADDED TO GROUPS OF IMAGES

CROSS REFERENCE TO RELATED APPLICATIONS

This application claims benefit under 35 U.S.C. §120 as a continuation of U.S. patent application Ser. No. 11/102,261 filed 8 Apr. 2005 by now U.S. Pat. No. 7,616,235 the instant inventors and entitled "Information Management Apparatus and Information Management Method" (as filed), which application claims benefit under 35 U.S.C. §119 of Japanese Applications No. 2004-128902, filed on Apr. 23, 2004. The contents of both applications are incorporated herein for all purposes by this reference.

BACKGROUND OF THE INVENTION

1. Field of the Invention

The present invention relates to a technique used for information management, and in particular to a technique for managing image data.

2. Related Art

Some of the recent digital cameras are equipped with so called album function for categorizing taken images in accordance with the user preference to manage the categorized image data in an album by storing them respectively in separate files.

For displaying a catalog of albums (i.e., index display) retained by the digital cameras equipped with such album function, there has been a conventional technique to select a specific image contained by each album as the cover thereof and display the image of the cover (N.B. this image is called "cover image" hereinafter) selected for each album for an index display. The user of the digital camera can infer the content of each album by the cover image as a clue by setting a selected image as the cover image of each album.

Meanwhile, another known technique for managing image data is to manage image data files by listing them. An example of this technique is found in a Japanese patent laid-open application publication No. 2001-8149 disclosing a technique to replay a representative image first when replaying an album by registering information identifying the representative image for the album at the head of control list.

Yet another technique of a kind is found in a Japanese patent laid-open application publication No. 11-224266 disclosing a technique to create automatically a book type of electronic image document for handling predetermined ones from among the representative images as covers, in addition to displaying a list of images selected by a required condition from among index images extracted from a series of images (i.e., moving image) as a series of representative images.

Generally speaking, a user naturally remembers the details in scenic contents of recently taken images better than those of images taken long ago. It is also natural that the user, even after finishing editing images for registering the categorized images in the album, remembers the scenic contents of images registered toward the end of the registration work better than that registered in the beginning.

In the meantime, while some of digital cameras equipped with the album function can add the title of the album to the cover image, the user may have a hard time recalling the content of the album by looking at the title of the cover image if the title is not well suited, in which case the images registered toward the end of editing work of the album may remain in the memory of user better than the entitled representative images in much more cases than not.

As such, it is desirable to make an image registered last in an album as the cover image representing the album in consideration of the connection between the memory of user and the album contents, because the images handled in any way toward the end of the work remain in the memory of user more clearly. In the conventional technique, however, the functions for registering a new image in the album and for selecting and setting a cover image for the album have been independent of each other, forcing the user to endure a cumbersome operation in order to register a new image as the cover image for the album.

SUMMARY OF THE INVENTION

An information management apparatus as one aspect of the present invention comprises a storage unit for storing group information relating to a group which image data belongs to and replay sequence information for indicating a replay sequence at the time of replaying image data belonging to the group, a designation unit for designating a group for new image data which does not belong to the group and an information renewal unit for adding or changing the group information and the replay sequence information, wherein the information renewal unit rewrites the replay sequence information so as to replay the new image data first from among the specified group when the designation unit designates a group for the new image data belonging to.

Meanwhile the above described information management apparatus may be configured to register the new image data as representative image of the designated group so as to be replayed first as the representative image.

The above described information management apparatus may also be configured to store the group information and the replay sequence information in the storage unit as a management file containing the aforementioned two kinds of information.

The above described information management apparatus may also further comprise a notification unit for notifying a renewed group when at least either the group information or the replay sequence information is renewed by a change or addition to the group.

Also in the aforementioned configuration, the notification unit may include an index display part for displaying image data extracted singularly from the each group by an index screen display as representative images of respective groups so as to show an icon superimposed on the representative image of the renewed group for meaning a predetermined operation having been done thereto.

Meanwhile, the above described information management apparatus may also be configured to let the information renewal unit renew information at the time of group information relating to image data being deleted from the group.

An information management method as another aspect of the present invention comprises the steps of having a memory memorize group information relating to a group which image data belongs to and sequence information for indicating a replay sequence of image data at the time of replaying image data belonging to the group; obtaining a designation of group for new image data which does not belong to the group; and renewing the group information and the sequence information so as to replay the new image data first at the time of replaying image data belonging to a designated group when obtaining the designation for the new image data.

BRIEF DESCRIPTION OF THE DRAWINGS

The present invention will be more apparent from the following detailed description when the accompanying drawings are referred to.

FIG. 7 is a flow chart showing processing content of cover image creation processing;

FIG. 9 is a flow chart showing processing content of title superimpose processing;

FIG. 14A exemplifies a first screen of album operation function selection screen;

FIG. 14B exemplifies a display of a list of album cover images;

FIG. 14C exemplifies a single frame display of album cover images;

FIG. 15A exemplifies a content of album list prior to an additional registration of image for an album;

FIG. 15B exemplifies a display of a catalog of album cover images displayed in accordance with the album list shown by FIG. 15A;

FIG. 15C exemplifies a content of album list after an additional registration of image for an album;

FIG. 15D exemplifies a display of a catalog of album cover images displayed in accordance with the album list shown by FIG. 15C;

FIG. 15E shows the relationship between an image data file in the album list shown by FIGS. 15A and 15C, and an album display image in the display example shown by FIGS. 15B and 15D;

FIG. 15F exemplifies an icon indicating a change of "additional registration" having been done to an album list;

FIG. 15G exemplifies an icon indicating a change of "deletion" having been done to an album list;

FIG. 15H exemplifies an icon indicating a change of "editing" having been done to an album list;

FIG. 20B shows a way of deleting the file name of a photographed image "006" from the photographed list vis-à-vis the storage state shown by FIG. 20A;

FIG. 22 is a flow chart showing processing content of album image deletion processing;

FIG. 23A exemplifies a second screen of album operation function selection screen;

FIG. 23B exemplifies a catalog display of images contained by an album;

FIG. 23E exemplifies a screen for instructing a deletion processing of image contained by an album.

DESCRIPTION OF THE PREFERRED EMBODIMENTS

The following describes an embodiment of the present invention while referring to the accompanying drawings.

Figure 1:
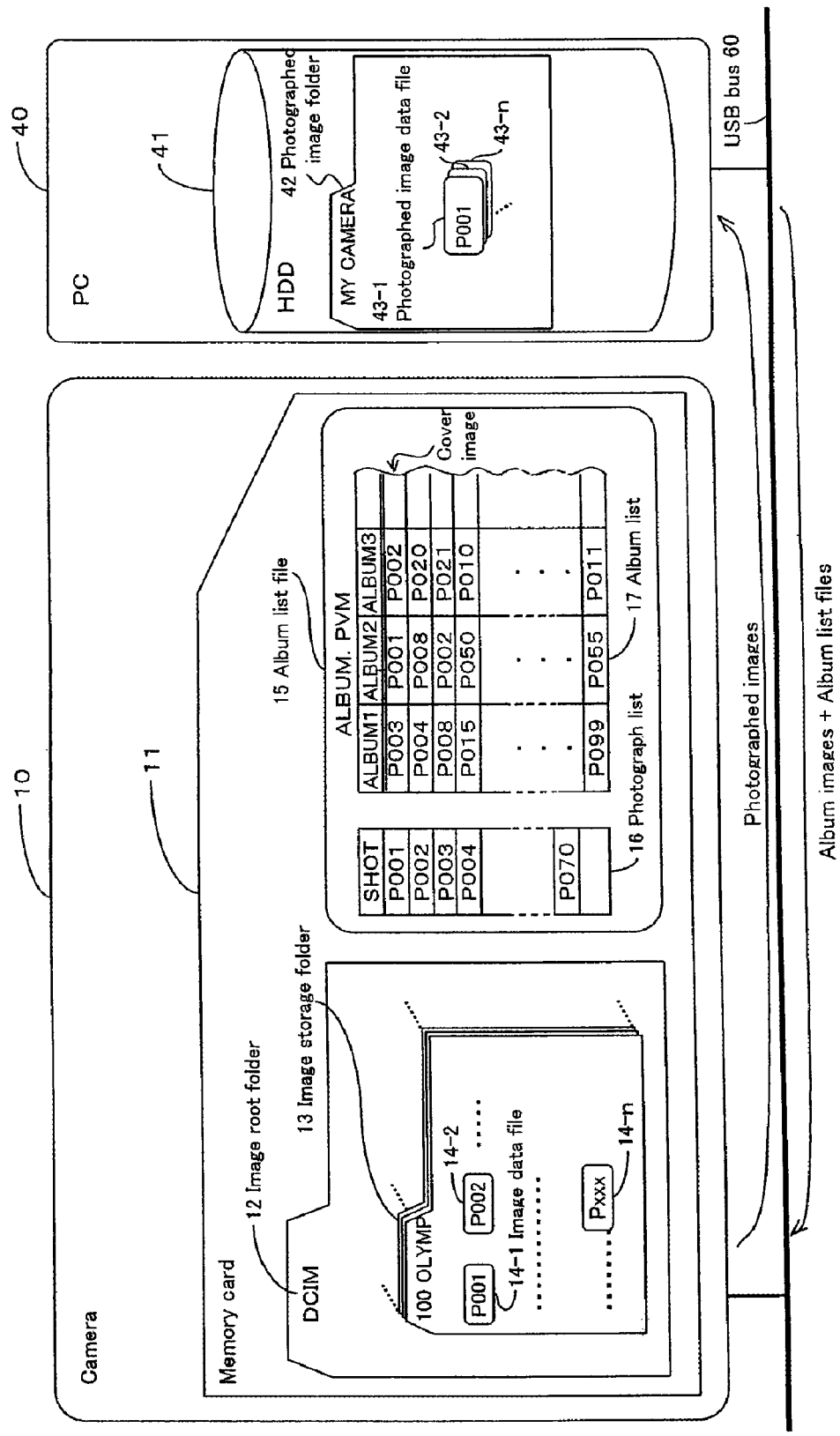
FIG. 1 describes a summary of embodiment of an album function.

First of all, let an outline of album function be described as an embodiment of the present invention while referring to FIG. 1.

FIG. 1 shows the way a camera 10 and a PC 40 being connected by way of a USB (Universal Serial Bus) 60, are mutually capable of handing out various kinds of data. The present embodiment makes it possible to transmit an image photographed by the camera 10 to the PC 40 temporarily, create an album for the image by the PC 40 and transmit the created album back from the PC 40 to the camera 10. After the aforementioned processing, the user can enjoy looking at the album only by carrying the camera 10, if he does not have the PC 40 there and then.

Let further detail of FIG. 1 be described. The camera 10 as the information management apparatus embodying the present invention is equipped with a detachable memory card 11 which can store various kinds of data. The memory card 11 stores an image root folder 12 and an album list file 15 both of which are placed immediately under the root directory thereof.

The image root folder 12 is the root folder for storing image data files. Images photographed by the camera 10 are stored in an image storage folder (i.e., "100 OLYMP" folder) 13 contained by the image root folder (i.e., "DCIM" folder) 12 as image data files 14-1, 14-2, . . . , 14-n and so on (to be represented by "14-n" hereinafter).

Note here that the image root folder 12 stores not only images photographed by the camera 10 but also image data files relating to the images registered in the albums (i.e., contained in the groups called "albums") without any specific categorization as described later. The file names of data files relating to images photographed by the camera 10 among the image data files 14-n will be added to a photograph list (i.e., "SHOT") 16 shown in the album list file 15 in order of photographing. Therefore, the camera 10 picks up the image data files 14-n of the file names shown in the photograph list 16 from the image root folder 12 to transfer to the PC 40 when transferring the images photographed by the camera 10 to the PC 40. The PC 40 at the receiving end stores the image data files 14-*n* transferred from the camera 10 in a photographed image folder (i.e., "MY CAMERA" folder) 42 as photographed image data files 43-1, 43-2, . . . , 43-*n*, and so on (represented by "43-*n*" hereinafter). The photographed image folder 42 is set up in the storage area of HDD (Hard Disk Drive) 41 comprised by the PC 40.

The album list file (i.e., "ALBUM.PVM" file) 15 is a management file for indicating relationship (subordinate relationship) between each of the image data files 14-*n* and the albums containing the image data file 14-*n* (i.e., the image data file 14-*n* belongs to). In the album list file 15, an album list 17 listing the file name of each file for the each album containing the file shows the aforementioned relationship. In the sequence of file names of the album list 17, the head thereof is supposed to write the file name of image data file for cover image applicable to the cover of the album. And the sequence of file names in each album list is used for the sequence information indicating the replay sequence at the time of replaying the images contained in the album. For instance, the cover image of album whose file name appears at the head of the list will be replayed first at the time of replaying the album.

Meanwhile, the album list file 15 also shows the photograph list 16 as described above.

Note that the present embodiment assumes that the number of albums managed by the album list 17 is predetermined, with each album being named as "ALBUM 1", "ALBUM 2", "ALBUM 3", and so on.

The album list file 15 is supposed to be sent from the PC 40 together with the image data files 14-*n* representing the images contained by the albums. When the image data files 14-*n* and the album list file 15 are sent from the PC 40, the camera 10 stores the image data files 14-*n* in the image storage folder 13 and stores the album list file 15 by overwriting with it immediately under the root directory in the storage area of the memory card 11. Here, the photograph list 16 is kept intact instead of being overwritten, however. In the meantime, if a memory card 11 having no album list file 15 therein is inserted to the camera 10, an album list file 15 is created in the memory card 11 for storing. This is because the information about the image photographed by the camera 10 needs to be written in the photograph list 16.

Note that the present embodiment assumes there is no overlapping in file names of data files whose data contents are different from each other in the image root folder 12 for simplicity. Therefore only a file name indicated in the photograph list 16 and the album list 17 can identify uniquely an image data file 14-*n* contained in the image root folder 12. Here, for example a configuration may alternatively be such that an image data file 14-*n* can be uniquely identified even if file names of image data files 14-*n* are overlapped in the image root folder 12 by showing also the information for indicating the storage place of a file in the photograph list 16 and the album list 17 in addition to the date and time of creating the file and the file name.

Figure 2A:
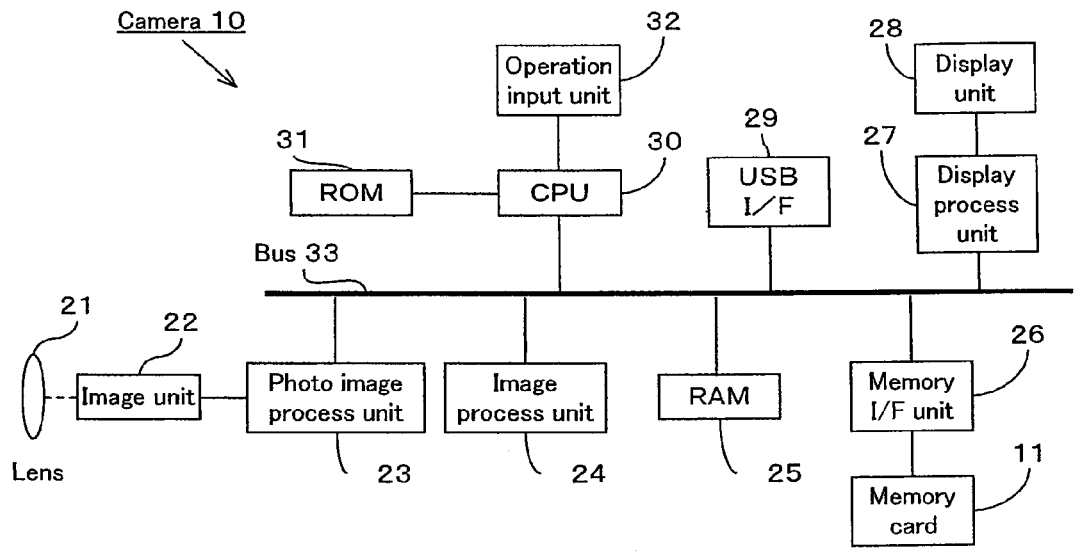
FIG. 2A shows a hardware configuration of the camera shown by FIG. 1.

The next description is about FIG. 2A which shows a hardware configuration of the camera 10 shown by FIG. 1.

In FIG. 2A, a photo image process unit 23, an image process unit 24, a RAM 25, a memory I/F (Interface) 26, a display process unit 27, a USB I/F 29 and a CPU 30 are all connected with a bus 33 and capable of exchanging mutually various kinds of data under the control of the CPU 30.

A photographic object imaged by a lens 21 is converted to an electric signal by an image unit 22 which is a CCD (Charge Coupled Device) for example, to be inputted to the photo image process unit 23 that amplifies the inputted electric signal to a predetermined amplitude followed by an A/D (analog to digital) conversion thereof to output the image data indicating the image which expresses the photographic object.

The image process unit 24 applies image processings such as gamma correction, edge enhancement, white balance correction, et cetera, of the image expressed by the aforementioned image data for the respective image data outputted from the photo image process unit 23. Also applies a data compression processing for the image data when storing it in a memory card 11 as required; and furthermore, applies a data decompression processing for image data read out of the memory card when replaying the image represented by the image data being stored in the memory card as required.

The RAM 25 is a random access memory for use as a work area when required for a various processings performed by the image process unit 24 or the CPU 30.

The memory I/F 26, being an interface used for connecting the memory card 11 with the bus 33, enables various writing and reading data in and out of the memory card 11 under the management of CPU 30.

The display process unit 27 applies a digital to analog (D/A) conversion to an image data received by way of the bus 33 to provide it to a display unit 28.

The display unit 28, being an LCD (Liquid Crystal Display) for example, displays an image represented by the image data being inputted into the display process unit 27.

The USB (Universal Serial Bus) I/F 29, being the interface connecting the USB bus 60 (shown by FIG. 1) and the bus 33, enables a various data exchanges between the camera 10 and the PC 40.

The CPU (Central Processing Unit) 30 controls the operation of the whole camera 10.

ROM 31 is a read only memory storing a control program executed by the CPU 30 and a various data for executing the control program as required, and the above described operation control is made possible by the CPU 30 executing the control program.

An operation input unit 32, comprehending switches operated by the user of camera 10, obtains a user instruction corresponding to the operation content and hands the instruction to the CPU 30.

Figure 2B:
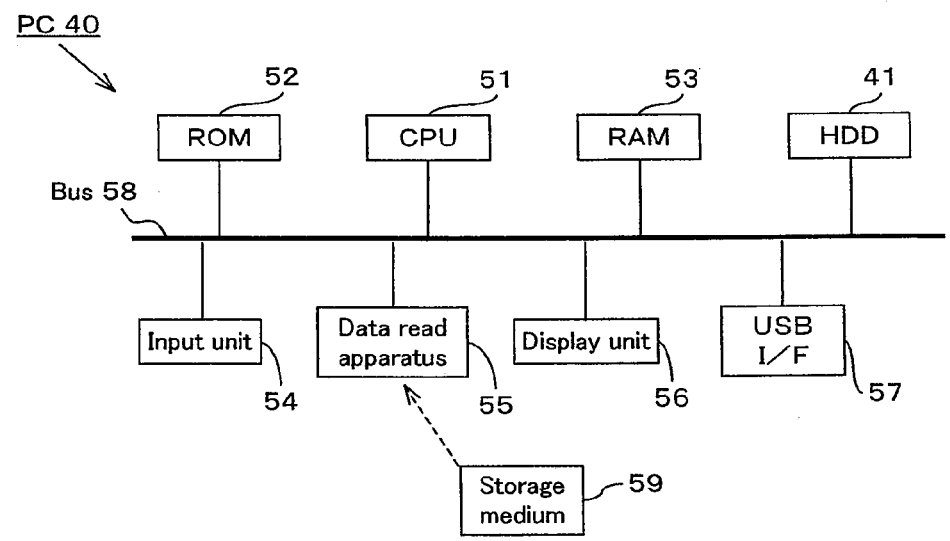
FIG. 2B shows a hardware configuration of the PC shown by FIG. 1.

The next description is about FIG. 2B which shows a hardware configuration of the PC 40 shown by FIG. 1.

In FIG. 2B, a CPU 51, a ROM 52, a RAM 53, an HDD 41, an input unit 54, a data read apparatus 55, a display unit 56 and a USB I/F 57 are all connected with a bus 58 and capable of exchanging various data mutually under the management of CPU 51.

The CPU 51 controls the entire operation of PC 40.

The ROM 52 is a read only memory storing the basic control program executed by the CPU 51 and a various data used for executing the program as required, and the operation control of the entire PC 40 is made possible by the CPU 51 executing the basic control program.

The RAM 53 is a random access memory used as a work area by the CPU 51 for various processing as required.

The HDD 41, being a magnetic disk apparatus, is capable of storing various control programs executed by the CPU 51 and various data used for the execution thereby as required, in addition to the above described photographed image data files 43-*n*.

The input unit 54, comprehending a pointing device such as mouse and a key board apparatus for example, obtains a user instruction corresponding to the operation contents of those devices.

The data read apparatus 55, comprehending a CD (Compact Disk)-ROM drive or a DVD (Digital Versatile Disk)-ROM drive for example, is an apparatus for reading various data stored by a storage medium 59, such as CD-ROM or a DVD-ROM, et cetera, which stores later described image management software for the commercial distribution. In the PC 40, the data read apparatus 55 reads the image management software out of the storage medium 59 and stores in the HDD 41 in advance so that the CPU 51 reads the aforementioned image management software out of the HDD 41 to execute an instruction when the user gives the execution instruction thereof through the input unit 54.

Meanwhile the storage medium 59 may be configured by a storage apparatus comprised by a computer equipped with a program server function and being connected with a communication network such as the Internet. In such a case, transmitting a transmission signal gained by modulating a carrier wave by the data signal expressing the image management software to the computer from a program server by way of a communication line as transmission medium on one hand, and the PC, comprising an apparatus for connecting with the communication line, receiving the transmission signal, demodulating it and reconstructing the image management software on the other will enable the CPU 51 to execute it.

The display unit 56, comprehending an LCD or a CRT (Cathode Ray Tube) for example, displays a predetermined image in compliance with an instruction of CPU 51.

The USB I/F 57, being an interface for connecting the USB bus 60 shown by FIG. 1 and the bus 58, enables various data exchanges between the PC 40 and the camera 10.

Meanwhile, the PC 40 is configured as a standard computer usually is.

The next description is about image management software executed by the CPU 51 comprised by the PC 40. The image management software provides the functions of taking an image photographed by the camera 10 into the PC 40; and creating and editing albums, making a cover image for each album and transmitting the albums back to the camera 10, all in the PC 40. The following description is about each of various control processings by the CPU 51 executing the image management software.

Figure 3:
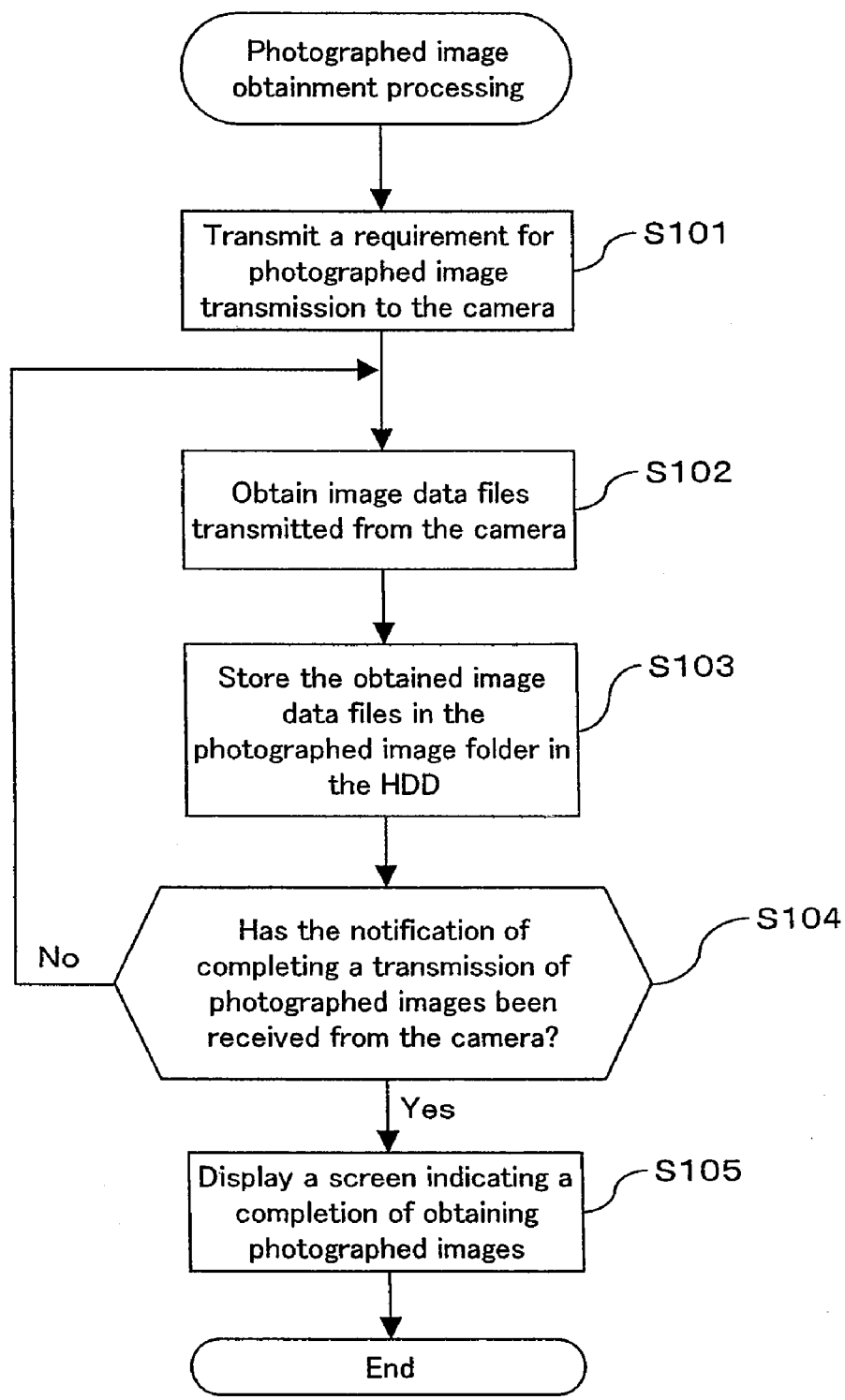
FIG. 3 is a flow chart showing processing content of photographed image obtainment processing.

The first description is about FIG. 3 which is a flow chart showing a processing content of photographed image obtainment processing which is a processing for receiving the image data files 14-$n$ relating to the images photographed by the camera 10 to let the photographed image folder 42 placed in the HDD 41 store them as the photographed image data files 43-$n$. Incidentally, the processing is initiated to execute when an instruction for starting the processing is inputted in the input unit 54, that is, for instance a displayed button indicating "image read-in" is clicked on in a screen displayed by the display unit 56 in the PC 40 which is executing the image management software. An alternative configuration may be to start the processing automatically when the CPU 51 detects a connection of the camera 10 with the PC 40 by way of the USB bus 60.

When the processing starts, the processing lets the USB I/F 57 transmit data addressed to the camera 10 for requiring a transmission of photographed image in the step S101 (a la "S101" hereinafter).

Over at the camera 10, upon receiving the transmission requirement data transmitted by way of the USB bus 60, the CPU 30 refers to the photograph list 16 stored in the memory card 11, reads an image data file 14-$n$ indicated by the file name therein out of the image root folder 12 and transmits the readout image data file 14-$n$ to the PC 40 by way of the USB I/F 29. And then, the CPU 30 transmits data indicating a completion of transmitting the photographed image to the PC 40 by way of the USB I/F 29 when completing a transmission of all the image data files 14-$n$ being indicated by the file names in the photograph list 16.

In S102, the processing obtains the image data files 14-$n$ transmitted from the camera 10 by way of the USB bus 60 at the USB I/F 57, followed by storing the obtained image data files 14-$n$ in the photographed image folder 42 placed in the HDD 41 as the photographed image data files 43-$n$ in S103.

Subsequently, judges whether or not the camera 10 has sent data notifying a completion of transmitting the photographed images in S104 and, if the notification is received ("yes" for the judgment), the photographed image obtainment processing ends. On the other hand, if the notification has not been received ("no" for the judgment), the process goes back to S102 for repeating the above described processing.

Such is the photographed image obtainment processing.

Figure 4:
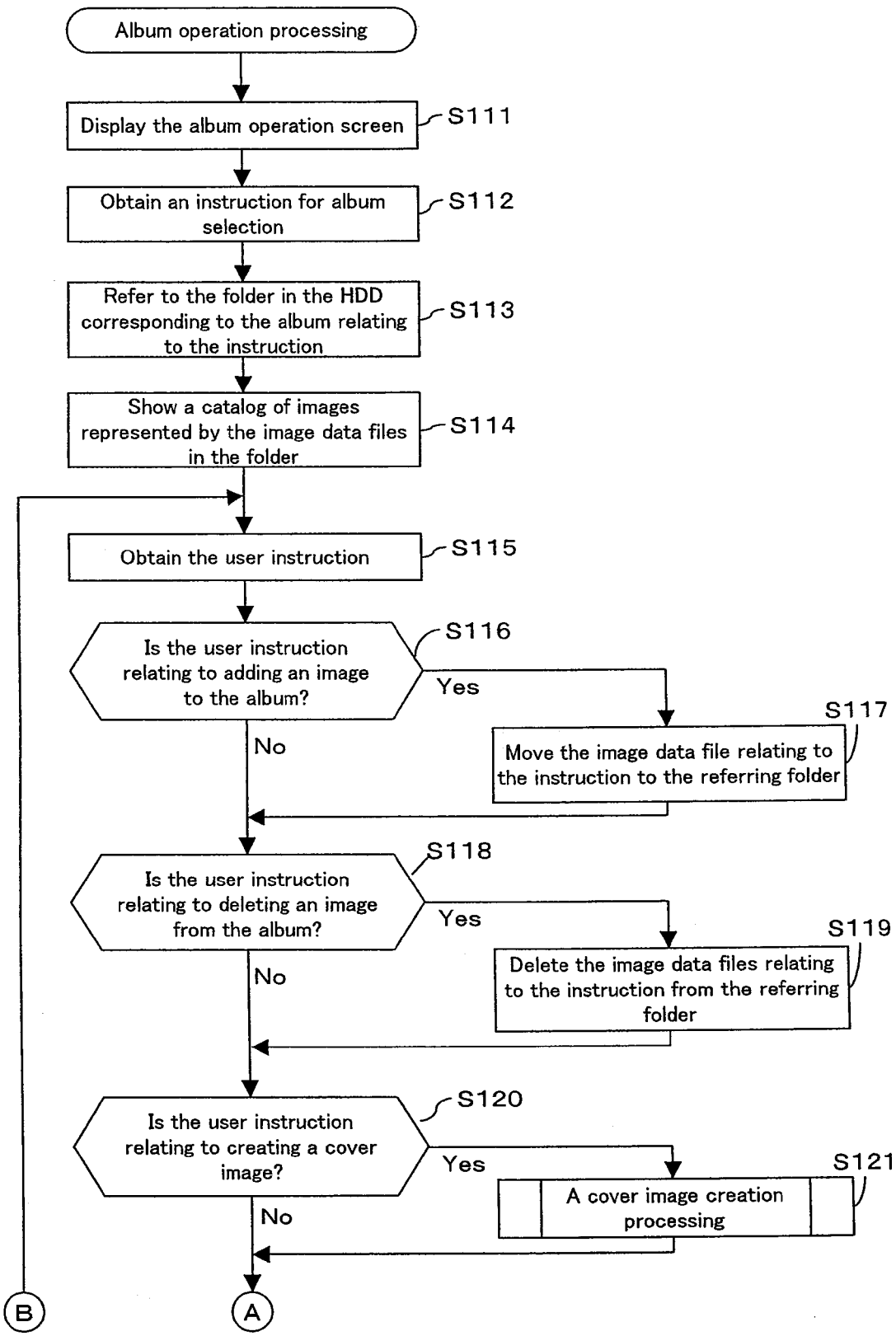
FIG. 4 is a flow chart (part 1) showing processing content of album operation processing.
Figure 5:
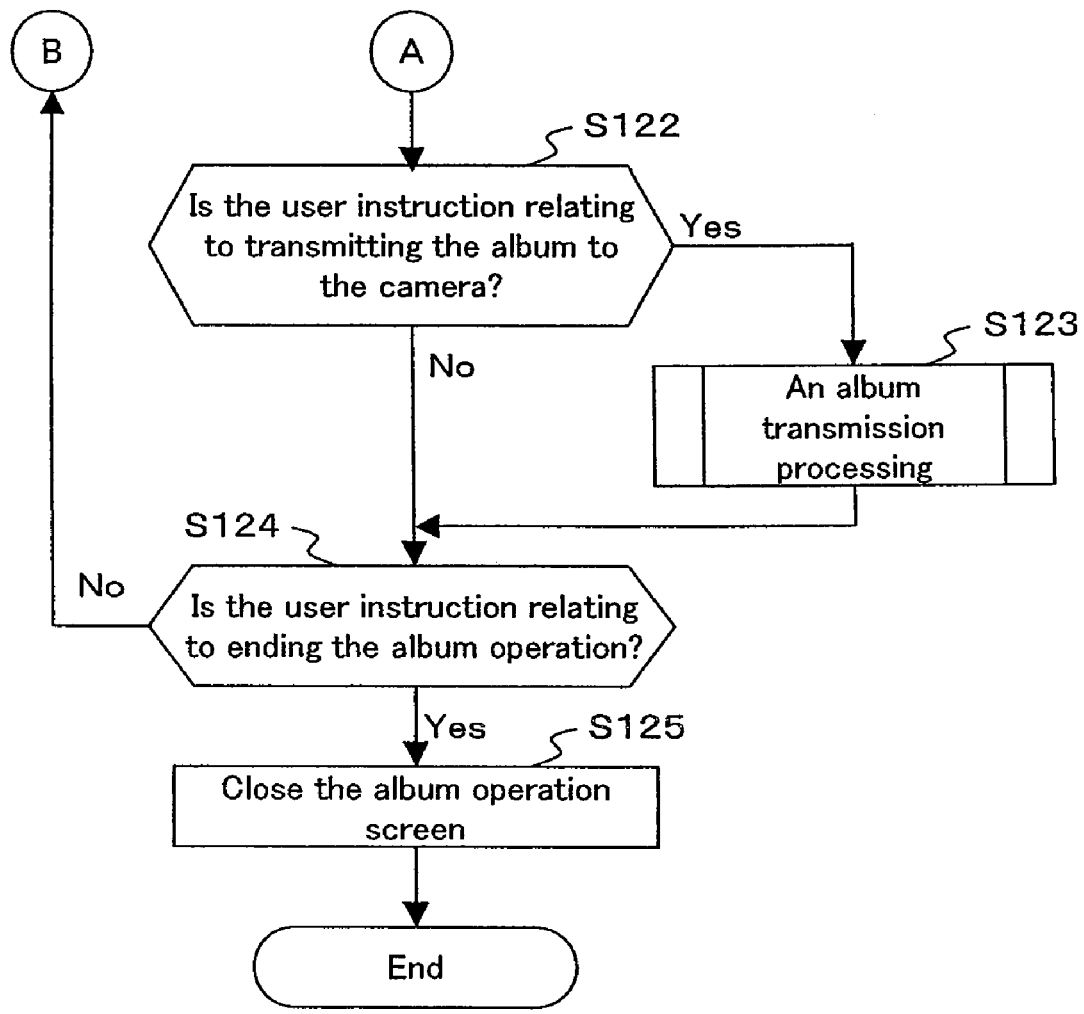
FIG. 5 is a flow chart (part 2) showing processing content of album operation processing.

The next description is about FIGS. 4 and 5 together of which is a flow chart showing a processing content of album operation processing. The processing deals with editing the album, creating a cover image of the album, superimposing a title character string on the cover image and transmitting the album back to the camera 10. Incidentally, the processing is initiated to execute when an instruction for starting the processing is inputted in the input unit 54, that is, for instance a displayed button indicating an instruction for operating an album is clicked on, et cetera, in a screen displayed by the display unit 56 as a result of executing the image management software for inputting via the input unit 54 on the PC 40 which is executing the image management software.

First in S111 shown by FIG. 4, the processing is to let the display unit 56 display an album operation screen.

Figure 6:
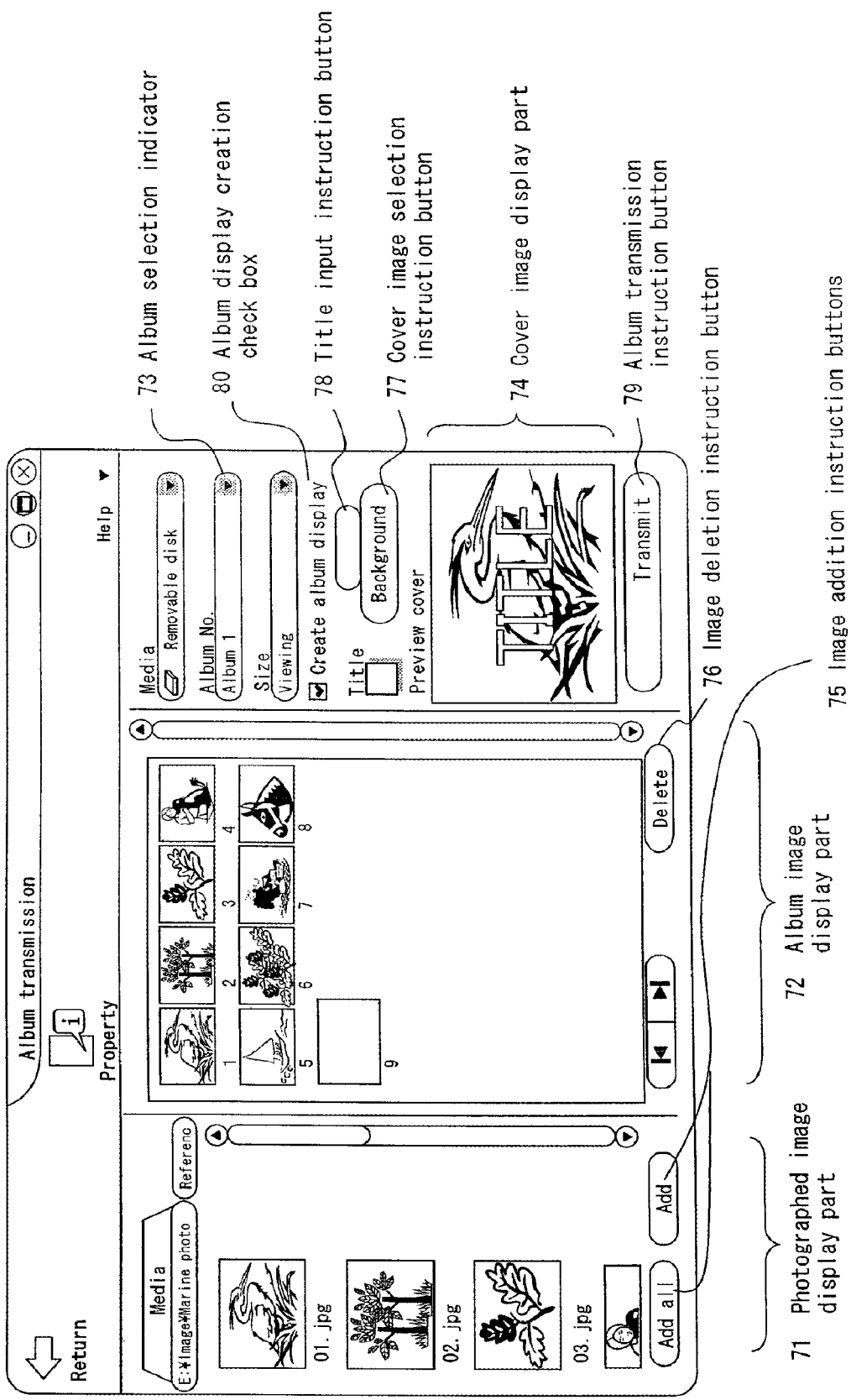
FIG. 6 exemplifies an album operation screen.

FIG. 6 exemplifies an album operation screen. Note that the photographed image data files 43-$n$ stored by the photographed image folder 42 placed in the HDD 41 are read out and a catalog of images (each image will be called "photographed image" hereinafter) represented by the respective photographed image data files 43-$n$ are displayed in the photographed image display part 71 shown by FIG. 6 at this stage in the present embodiment.

In S112, the processing is to obtain an instruction of the user for selecting an album as the object of album operation for this time at the input unit 54. Incidentally the album selection is done by clicking the pointer, et cetera, for an album selection indicator 73 shown by FIG. 6.

In S113, the processing is to refer to the folder corresponding to the album related to the obtained instruction (this folder will be called "album folder" hereinafter) by the processing in the previous step from among the folders stored in the HDD.

In S114, the processing is to read the image data files stored in the referring album folder and let the display unit 56 display a catalog of images (each of the images will be called "album image" hereinafter) represented by the readout image data files in the album operation screen which is currently displaying.

In the example shown by FIG. 6, the album image display part 72 displays a catalog of the album images. If an image data file of cover image is contained in the album folder, the cover image represented by the image data file will be displayed in the cover image display part 74.

In S115, the processing is to obtain an instruction of the user corresponding to the operation done for the input unit 54. Note that the instruction corresponds to a clicking of any one of image addition instruction buttons 75, image deletion instruction button 76, cover image selection instruction button 77, title input instruction button 78 or album transmission instruction button 79 in the example of screen shown by FIG. 6.

In S116, the processing is to judge whether or not the obtained instruction in S115 is the one corresponding to the image addition instruction button 75 shown by FIG. 6, that is, an instruction to add a photographed image to the album and, only if the judgment result is "yes", then In S117, let the image data file of the photographed image relating to the instruction move to the currently referring album folder.

Note that the image addition instruction buttons 75 include an "add all" and "add" buttons. The "add all" button is for instructing to move all of the image data files of the photographed images to the currently referring album folder, while the "add" button is for instructing to move a part of image data files already selected by an operation in the input unit 54 from among the photographed images. Therefore the ones not selected among the photographed images will be left in the photographed image folder 42.

Meanwhile, the display position of the photographed images relating to the instruction is moved from the photographed image display part 71 to the end portion of images displayed in the album image display part 72 in the example screen shown by FIG. 6.

In S118, the processing is to judge whether or not the obtained instruction by the processing of S115 is corresponding to the image deletion instruction button 76, that is, the instruction for deleting the album image from the album and, only if the judgment is "yes", delete the image data file of the album image relating to the instruction from the currently referring album folder in S119.

Incidentally, clicking on the image addition instruction buttons 75 deletes the image data files of the album images thereof already selected by such operation in the input unit 54 from the currently referring album folder in the example shown by FIG. 6.

Also in the screen example shown by FIG. 6, delete the display of album images relating to the instruction from the catalog of images shown in the album image display part 72 associated with deleting the image data file.

In S120, the processing is to judge whether or not the obtained instruction by the processing of S115 is relating to a creation of cover image, that is, relating to the cover image selection instruction button 77 or the title input instruction button 78 in the example shown by FIG. 6 and, only if the judgment result is "yes", perform a cover image creation processing In S121 which will be described in detail later.

Now proceeding to the description of FIG. 5, In S122, the processing is to judge whether or not the obtained instruction by the processing in S115 is relating to the album transmission instruction button 79 in the example shown by FIG. 6, that is, an instruction for transmitting the album to the camera 10 and, only if the judgment result is "yes", perform the album transmission processing In S123 which will also be described in detail later.

In S124, the processing is to judge whether or not the obtained instruction by the processing in S115 was relating to ending the album operation processing and, if the judgment result is "yes", then close the album operation screen displayed by the display unit 56 In S125, thus ending the album operation processing. On the other hand, if the judgment result in S124 is "no", go back to the S115 shown by FIG. 4 to repeat the above described processings.

Such is the album operation processing.

The next description is about a cover image creation processing that is the one in S121 shown by FIG. 4 as a part of the above described album operation processing. FIG. 7 is a flow chart showing a processing content of the cover image creation processing.

First in S141, the processing is to judge whether or not the obtained instruction by the processing in S115 was relating to the title input instruction button 78 in the example shown by FIG. 6, that is, the instruction for title input for the already set cover image and, if the judgment result is "yes", then proceed to the processing of the S149. On the other hand if the judgment result is "no", that is, the one relating to the cover image selection instruction button 77, then proceed to the processing of S142.

Figure 8:
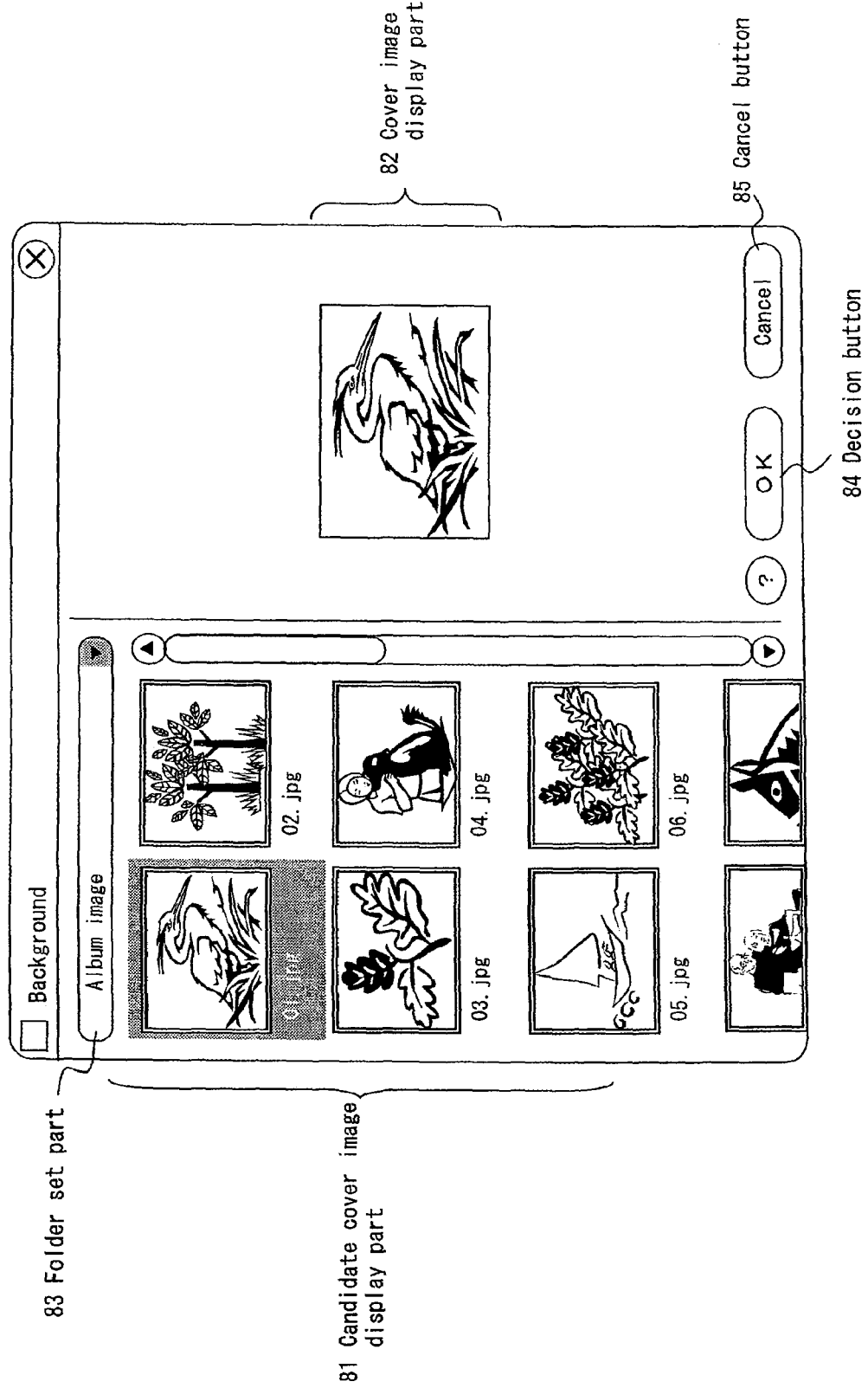
FIG. 8 exemplifies a cover image creation screen.

In S142, the processing is to open a cover image creation screen (i.e., by having the display unit 56 display). FIG. 8 exemplifies a cover image creation screen.

In S143, the processing is to read all the image data files out of the currently referring album folder, followed by letting the display unit 56 display a catalog of album images represented by the readout respective image data files in the currently displaying cover image creation screen in S144. In the screen example shown by FIG. 8, the catalog of images is displayed by a candidate cover image display part 81. Here, these images are candidates for a cover image and when the user operates the input unit 54 corresponding to an instruction for selecting an image, the image will be displayed in the cover image display part 82.

In S145, the processing is to judge whether or not an instruction for changing a candidate for the cover image by changing the referring folder has been obtained, that is, whether or not the instruction for changing the referring folders by clicking and the like in a folder set part 83 in the screen example shown by FIG. 8 has been received and, if the judgment result is "yes", refer to the folder relating to the obtained instruction in S146, followed by going back to S143 for repeating the above described processing. This processing makes it possible to select the cover image of the album as the object of album operation from images other than those of the referring album. On the other hand, if the judgment result in S145 is "no", proceed to the processing in S147.

In S147, the processing is to judge whether or not an instruction for deciding on a cover image has been obtained, that is, whether or not a decision button 84 has been operated in the screen example shown by FIG. 8 and, if the judgment result is "yes", read the file name for the image data file of the image relating to the decision instruction as the image data file of the cover image (i.e., cover image data file) to store temporarily in a certain area of the RAM 53 in S148, and perform a title superimposing processing in the subsequent S149, followed by the processing in S151. The title superimposing processing will be described in detail later. Meanwhile, in the screen example shown by the album operation screen shown by FIG. 6, the image displayed in the cover image display part 74 until this time will now be replaced by the cover image relating to the decision instruction.

In the meantime, if the judgment result in S147 is "no", proceed to the processing of S150.

In S150, the processing is to judge whether or not an instruction has been received for canceling the cover image creation processing, that is, operating the cancel button 84 in the screen example shown by FIG. 8 and, if the judgment result is "yes", proceed to the processing of the S151, and, if the judgment result is "no", then go back to the S145 to repeat the above described processing.

In S151, the processing is to close (i.e., erase) the cover image creation screen displayed by the display unit 56, thus ending the cover image creation processing, followed by going back to the album operation processing shown by FIG. 4.

Such is the cover image creation processing.

The next description is about a title superimposing processing which is the one for the S149 in the above described cover image creation processing.

FIG. 9 is a flow chart showing a processing content of title compound processing.

Figure 10:
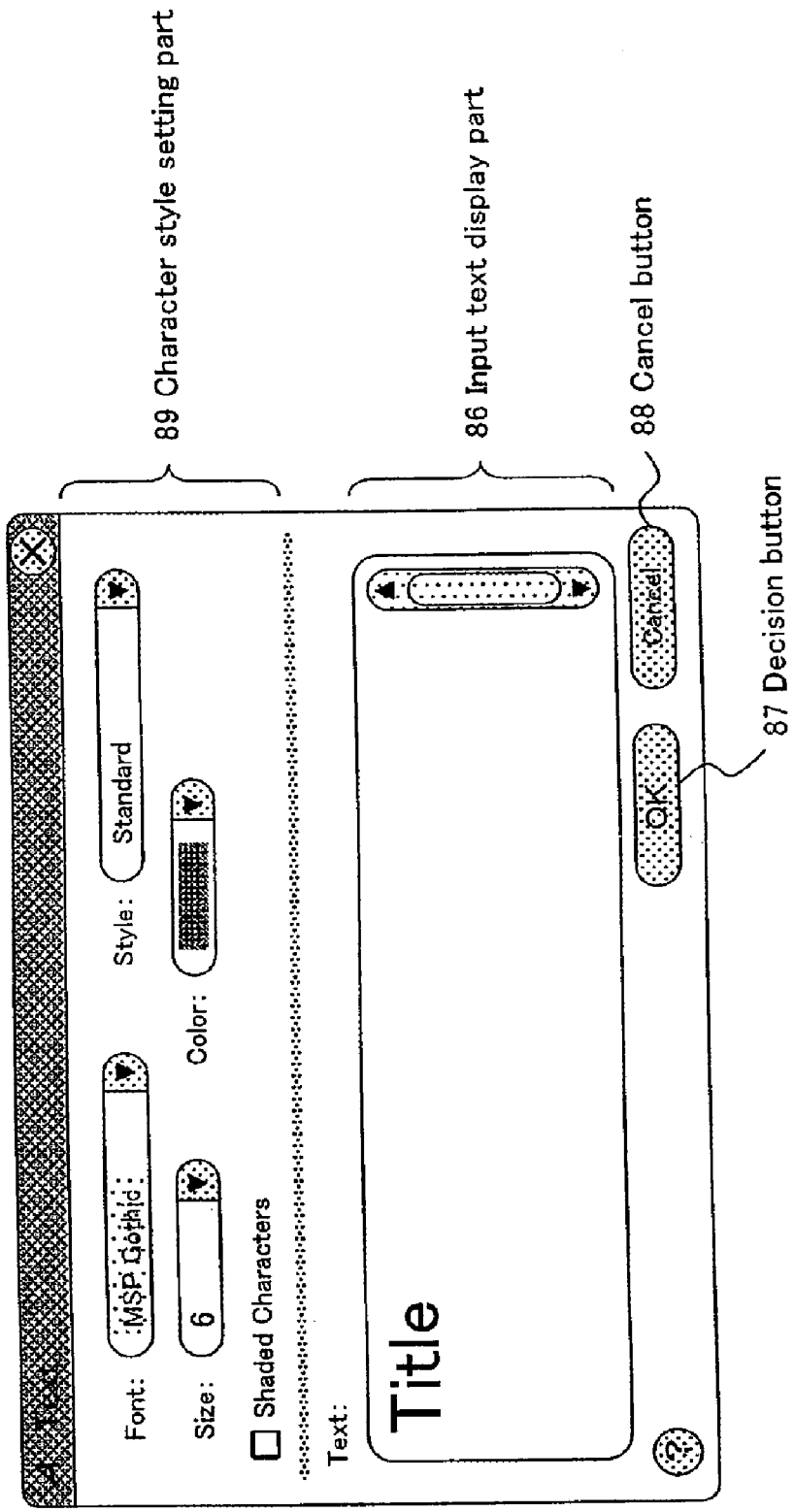
FIG. 10 exemplifies a title input screen.

First in S161, the processing is to open a title input screen (by having the display unit 56 display). FIG. 10 exemplifies a title input screen.

In S162, the processing is to obtain the content of character string corresponding to the user inputting in the input unit 54. In the screen example shown by FIG. 10, the content of obtained character string is displayed in the input text display part 86.

In S163, the processing is to judge whether or not an instruction has been received for completing an input of character string and deciding the character string for the title, that is, an operation is done for the decision button 87 in the screen example shown by FIG. 10 and, if the judgment result is "yes", proceed to the processing of S165. On the other hand, if the judgment result is "no", judges whether or not an instruction has been received for canceling the title superimpose processing, that is, an operation is done for the cancel button 88 in the screen example shown by FIG. 10 in S164. If the judgment result is "yes", proceed to the processing of the S166, while if the judgment result is "no", goes back to the S152 to repeat the above described processing.

In S165, the processing is to generate the character string image expressing the obtained character string by the processing of S162, superimpose the generated character string image on the cover image represented by the cover image data file stored in the certain area of the RAM 53 by the processing in S148 of the above described cover image creation processing (shown by FIG. 7) and store the image data file expressing the obtained superimposed image in the aforementioned certain area of the RAM 53 anew. Incidentally, the character string image is generated based on the set form, size and color established by the character style set part 89 in the screen example shown by FIG. 10.

In S166, the processing is to assign a predetermined file name to the cover image data file stored in the certain area of the RAM 53, and store the cover image data file by adding to the currently referring album folder in S167. Incidentally, the image displayed until this time in the cover image display part 74 will now be replaced by the cover image superimposed by the character string in the album operation screen example shown by FIG. 6.

In S168, the processing is to close (i.e., erase) the title input screen currently displayed by the display unit 56, thus ending the title superimposing processing, followed by going back to the cover image creation processing shown by FIG. 7.

Such is the title superimposing processing. Thus superimposing a character string image expressing the title on the cover image enables a camera 10 having no font data for characters such as Kanji characters to display an album title, with a various styles of the characters expressing the title being made possible.

Figure 11:
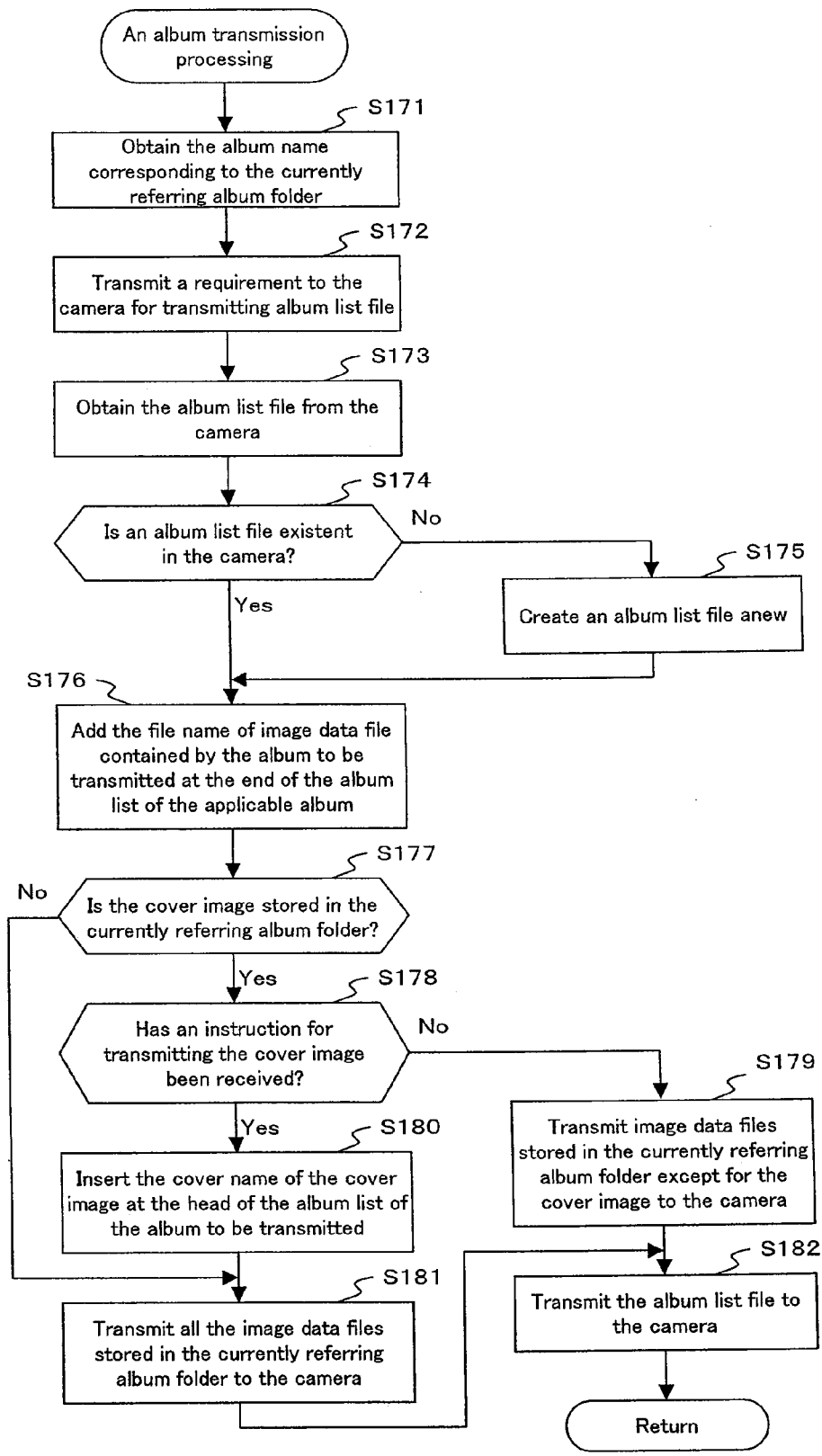
FIG. 11 is a flow chart showing a processing content of album transmission processing.

The next description is about an album transmission processing that is the one by the S123 (shown by FIG. 5) in the above described album operation processing. FIG. 11 is a flow chart showing a processing content of album transmission processing.

First in S171, the processing is to obtain the album name corresponding to the currently referring album folder.

In S172, the processing is to transmit data to the camera 10 by way of the USB I/F 57 requiring a transmission of album list file 15 stored in the memory card 11 comprised by the camera 10. A detailed description of processing in the camera 10 receiving the transmission requirement will be given later.

In S173, the processing is to obtain the album list file 15 transmitted from the camera 10 in response to the above described requirement by way of the USB I/F 57.

Note that the camera 10 may send back data notifying that there is no album list file 15, which will be described in detail later. If the aforementioned data is received from the camera 10, the processing in S174 is to judge whether or not there is an album list file 15 in the camera 10 and, only if there is not (i.e., the judgment is "no"), make an album list file 15 anew in S175.

In S176, the processing is to refer to the list in the album by the album name obtained by the processing of the S171 within the album list 17 contained by the album list file 15, and add the file names of the image data files contained in the currently referring album folder placed in the HDD 41 one by one to the tail end of the sequence of file names of the image data files being shown in the list.

In S177, the processing is to judge whether or not the image data file of the cover image is contained in the currently referring album folder and, if the judgment is "yes", proceed to the S178, while it is "no", proceed to the S181.

In S178, the processing is to judge whether or not an instruction for transmitting the title image has been received and, if the judgment is "yes", proceed to the S180, while it is "no", proceed to the S179. Incidentally, the instruction for transmitting the title image is judged whether or not the check mark for the cover creation check box 80 has been put in the screen example of the album operation screen shown by FIG. 6.

In S179, the processing is to transmit all the data files contained in the currently referring album folder except for the one for the cover image to the camera 10 by way of the USB I/F 57, followed by proceeding to the S182.

In S180, the processing is to insert the file name of the image data file of the cover image stored in the currently referring album folder by moving to the head of a list within the album list in which the file name has been added to in the processing of the S176. By this processing, the file name for the image data file of the cover image will be shown at the head of list within the album in the album list 17.

Meanwhile, the processing of the S180 may be changed to insert the file name of the image data file of the cover image stored in the currently referring album folder at the tail end of the list so as to replay the cover image at the end of a sequential replay of the album images. This is for handling the cover image created by the above described processing as if it were the back cover of the album.

In S181 the processing transmits all the image data files contained by the currently referring album folder to the camera 10 by way of the USB I/F 57.

In S182 the processing transmits the album list file 15 in which file names have been added to the album list 17 to the camera 10 by way of the USB I/F 57, thus ending the album transmission processing, followed by going back to the album operation processing shown by FIG. 5.

Such is the album transmission processing.

The next describes the control processing performed by the CPU 30 comprised by the camera 10. These processings are accomplished by the CPU 30 executing control programs stored in the ROM 31.

Figure 12:
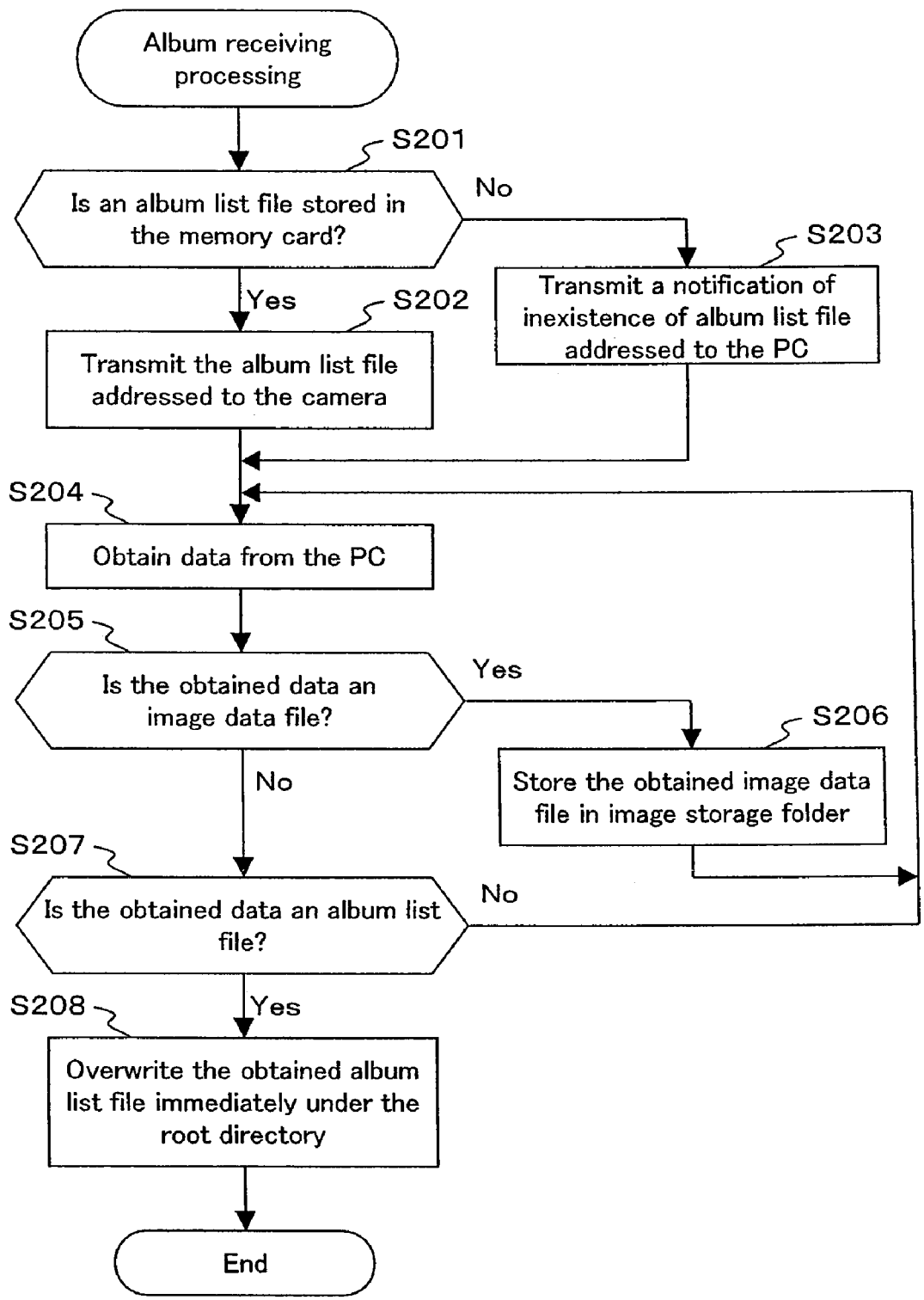
FIG. 12 is a flow chart showing processing content of album receiving processing.

The first description is about an album receiving processing outlined by the flow chart shown by FIG. 12. This processing is for the camera 10 receiving data relating to the album transmitted from the PC 40, which is initiated by the CPU 30 detecting that the USB I/F 29 has received the data indicating a requirement for transmitting the album list file 15 following the PC 40 executing the above described album transmission processing.

First in S201, the processing is to judge whether or not the album list file 15 is stored by searching the memory card 11 and, if it is stored (i.e., "yes" in the judgment result), read out the album list file 15 to transmit to the PC 40 by way of the USB I/F 29 in S202; whereas if it is not stored (i.e., "no" in the judgment result), transmit data for notifying of an album list file 15 being inexistent to the PC 40 by way of the USB I/F 29 in S203. The data transmitted by the processing in S202 or S203 is received by the PC 40 executing the processing of S173 in the above described album transmission processing.

In S204, the processing obtains the data transmitted from the PC 40 in response to the data transmitted by the processing in S202 or S203 by letting the USB I/F 29 receive it.

In S205, the processing is to judge whether or not the obtained data by the processing of the previous step is an image data file and, if the judgment result is "yes", store the obtained image data file in the image storage folder 13 contained by the image root folder 12 of the memory card 11 in S206, followed by going back to S204 for repeating the above described processing.

On the other hand, if the judgment result in S205 is "no", judge whether or not the obtained data by the processing of the S204 is the album list file 15 in S207. If the judgment result is "yes", the album transmission processing being executed by the PC 40 is regarded as complete, because the PC 40 executing the above described album transmission processing transmits the album list 15 after completing transmission of all the image data files to be transmitted as a result of processing in S179, S181 and S182, all shown by FIG. 11, thus proceeding to the S208. On the other hand, if the judgment result in S207 is "no", it goes back to the S204 for repeating the above described processing.

In S208, the processing overwrites the album list file 15 obtained by the processing of the S204 immediately under the root directory of the memory card. In this processing, however, the photograph list 16 shown by the pre-overwritten album list file 15 remains untouched. Thus, the album receiving processing ends.

Such is the album receiving processing.

Figure 13:
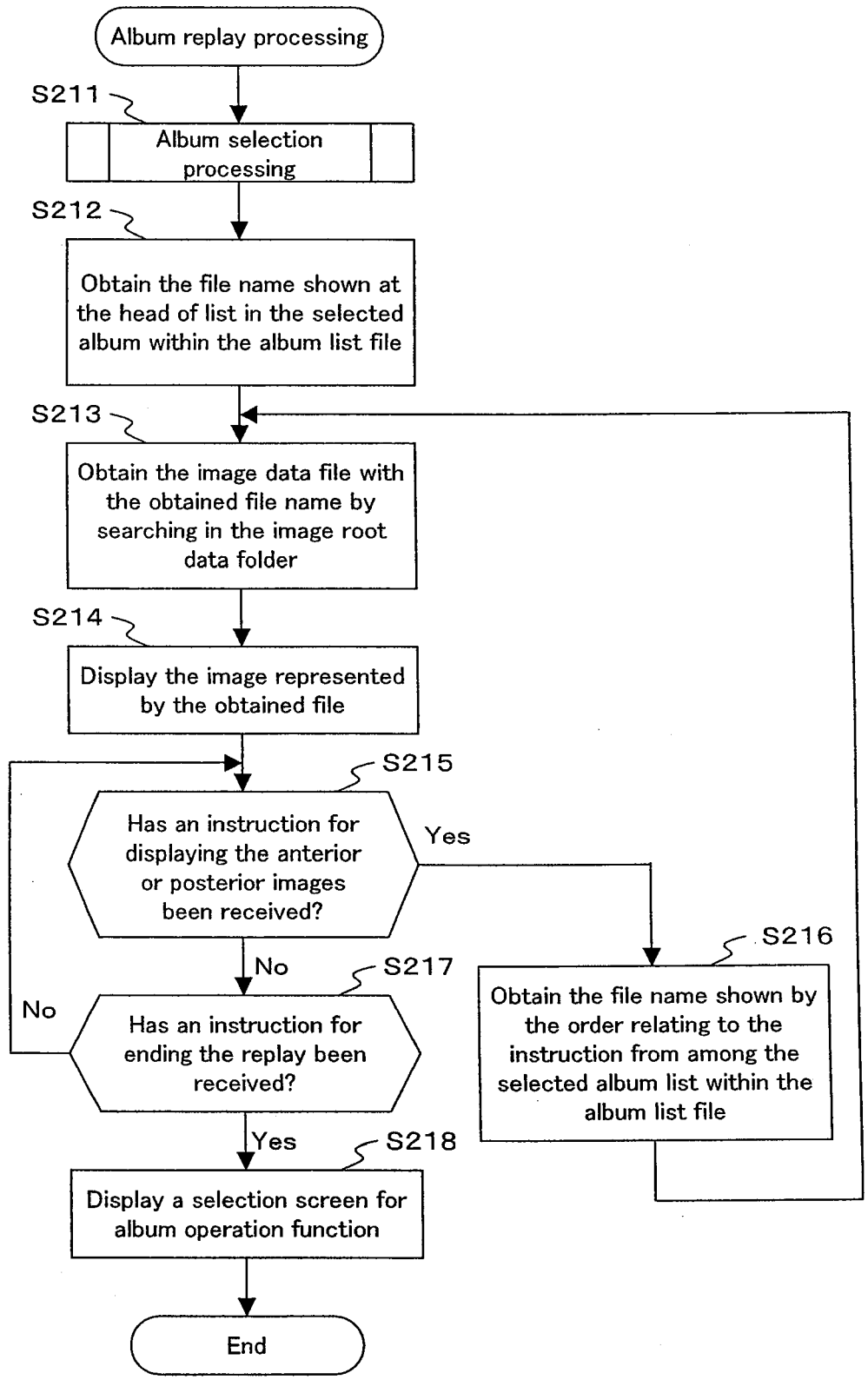
FIG. 13 is a flow chart showing processing content of album replay processing.

The next description is about an album replay processing shown by the flow chart of its processing content in FIG. 13. This is a process for viewing an album sent from the PC on the camera 10.

To start the album replay processing, first the user operates the operation input unit 32 so as to make the display unit 28 display a function selection screen relating to the album operation as shown by FIG. 14A and then further operates the operation input unit 32 so as to select the function of "album replay".

First in S211, an album selection processing is done. The processing selects an album for viewing from among a plurality of albums retained by the camera 10, a detail of which will be described later.

In S212, the processing is to refer to the album list 17 shown by the album list file 15 which is stored in the memory card 11 to obtain the file name at the head from among the file names listed corresponding to the selected album by the processing of the S211.

In S213, the processing is to obtain the image data file 14-*n* corresponding to the obtained file name by the immediately previous processing by searching the aforementioned file name in the image root folder 12 of the memory card 11.

In S214, the processing is to give instructions to the image process unit 24 and the display process unit 27 to let the display unit 28 display the image represented by the file obtained in the previous step.

In S215, the processing is to judge whether or not an instruction for making a displayed image in the display unit 28 change from the currently displayed to the anterior or posterior images has been received, which is an instruction by the user operating the operation input unit 32 and, if the instruction has been received ("yes" for the judgment result), proceed to the S216, while, if the instruction has not been received ("no" for the judgment result), then proceed to the S217.

In S216, the processing is to refer to the album list 17 shown by the album list file 15 stored in the memory card 11 to obtain the file name of the order relating to the instruction which has been judged to be given from among the file names arranged in correspondence with the album selected by the processing of the S211, followed by going back to the S213 for repeating the above described processings.

In S217, the processing is to judge whether or not an instruction for ending the album replay processing has been received, which is done by the user operating the operation input unit 32, and, if the instruction has been received ("yes" for the judgment result), make the function selection screen relating to the album operation as described above be displayed again in S218, thus ending the album replay processing. On the other hand, if the judgment result in S217 is "no", then go back to the S215 for repeating the above described processings.

Such is the album replay processing.

At this time, the description is how an album editing is done in the camera 10.

FIGS. 15A and 15C respectively exemplify the contents of album list 17 prior to and after adding an image to one of the albums stored in the camera 10 for registration; FIGS. 15B and 15D respectively exemplify the catalogs of album cover images (i.e., index display) displayed by the display unit 28 in accordance with the album list 17. And, FIG. 15E shows the relationship between an image data file 14-*n* and the display image in the examples shown by FIGS. 15A and 15C, and FIGS. 15B and 15D.

In the album list 17 shown by FIG. 15A, the head of "Album 2" list shows the file name "P1010021.JPG." As described above, since the file name of image data file representing the cover image corresponding to the cover of the album is written at the head of file names in the album list 17, the catalog display screen displaying the cover image of each album according to the album list 17 shown by FIG. 15B displays the image of flower which is the image of "P1010021.JPG" whose relationship is shown by FIG. 15E as the cover image of the "Album 2".

Here, the image of house expressed by "P1010078.JPG" will be added to the "Album 2". In this, an album list renewal for inserting, at the head of the list for the "Album 2" in the album list 17, the file name "P1010078.JPG" of the image data file representing the image of the house to be registered will be done as shown by FIG. 15C in the camera 10. That is, the camera 10 according to the present invention is configured to set a newly registering image as the cover image of the applicable album automatically when registering the image in an album anew. This eliminates a need of separate operations between registering an image in an album and setting the image as the cover image for the album, that much simplifying the operational procedures for the registration and setting.

As described above, the "P1010078.JPG" is inserted at the head of "Album 2" list in the album list 17, therefore the catalog display screen of the cover image of each album according to the album list 17 shown by FIG. 15D displays the image of the house whose relationship with the "P1010078. JPG" is shown by FIG. 15E.

Incidentally, the image of the house expressed by "P1010078.JPG" as a cover image shown by FIG. 15D is superimposed by an icon shown by FIG. 15F. Displaying the icon notifies the user of an additional registration to the "Album 2".

Note that the two other icons are provided in addition to the one shown by FIG. 15F in the present embodiment, that is, superimposing the icon shown by FIG. 15G on a cover image means a deletion of image from the album relating to the cover image; and the icon shown by FIG. 15H on a cover image means a certain editing (e.g., a change in the list sequence of the file name in the image data file 14-*n*, switching a cover image, et cetera), other than registration and deletion, has been done to the album relating to the cover image.

A notification to the user of a presence or absence of changing operation to the album visually by superimposing such icons on cover images enables the user to recognize what kind of change has been made to the album easily.

The following description is about the processing by the CPU 30 for accomplishing the above described album editing operation in the camera 10.

First description is about an album selection processing which is the processing of the S211 in the above described album replay processing.

Figure 16:
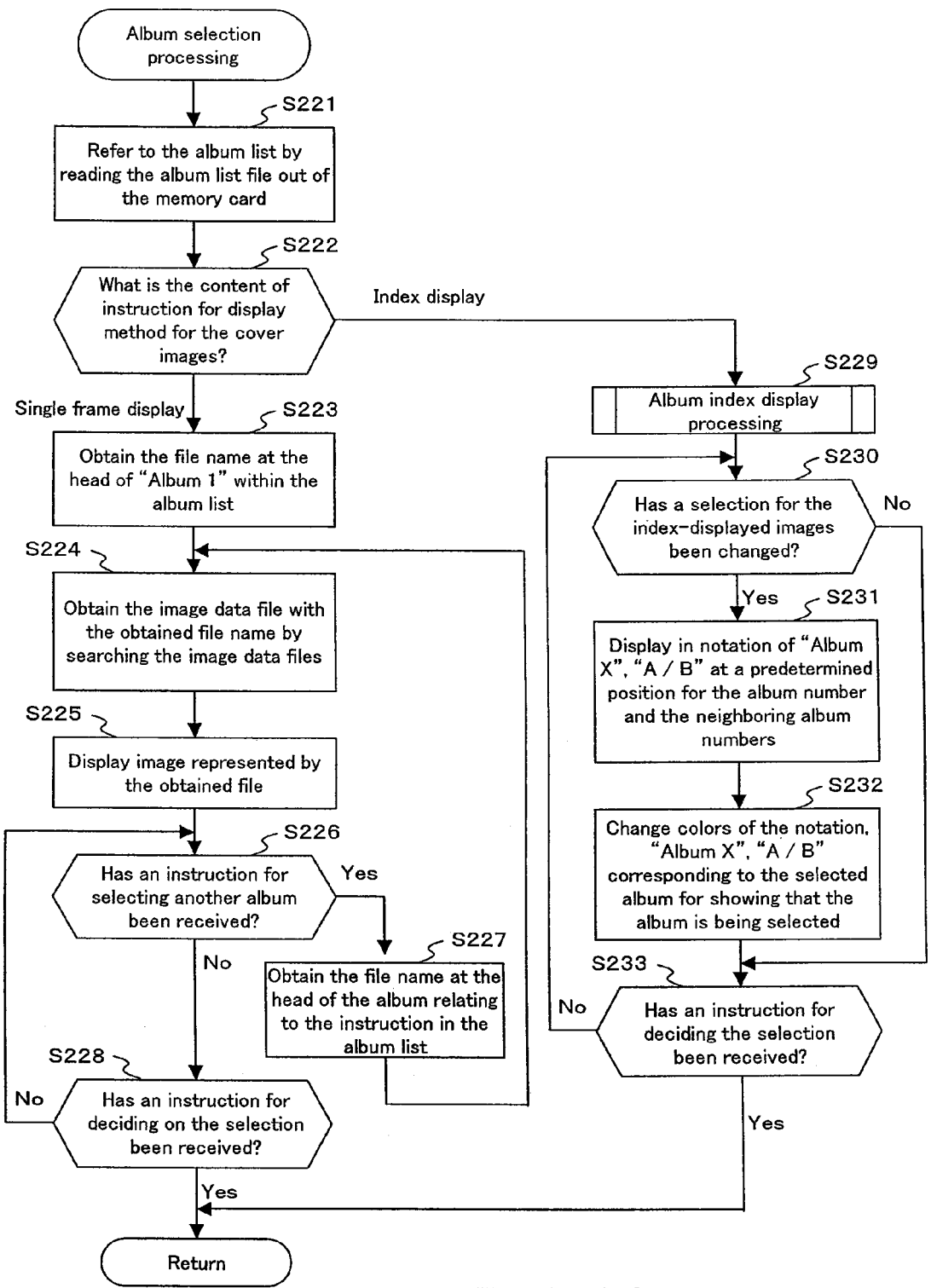
FIG. 16 is a flow chart showing processing content of album selection processing.

FIG. 16 is a flow chart showing a processing content of album selection processing.

First in S221, the processing refers to the album list 17 by reading the album list file 15 out of the memory card 11.

In S222, the processing determines the content of instruction, which is given by the user operating the operation input unit 32, regarding a method for displaying the cover image in the display unit 28. Here, if the aforementioned instruction is for a catalog display of the cover images of the albums (i.e., index display) as exemplified by FIG. 14B, proceeds to the processing of S229; while the instruction is for displaying the cover images frame by frame (i.e., single frame display) as exemplified by FIG. 14C, proceeds to the S223.

In S223, the processing obtains the file name at the head of the sequence thereof for the image data files 14-*n* within the "Album 1," that is, the file name of the image data file 14-*n* which is the cover image of the album.

In S224, the processing obtains the image data file 14-*n*, whose file name has been obtained by the immediately previous processing, by searching in the image root folder 12 of the memory card 11.

In S225, the processing gives instructions to the image process unit 24 and the display process unit 27 to have the display unit 28 display the cover image represented by the image data file 14-*n* obtained by the processing of the previous step.

In S226, the processing judges whether or not an instruction has been received for selecting an album other than the one currently showing the representative image in the display unit 28 by the user operating the operation input unit 32 and, if the instruction has been received ("yes" for the judgment result), obtains the file name at the head of a list of file names of the image data files 14-*n* for the album relating to the aforementioned instruction in S227, followed by going back to the S224 for repeating the above described processings.

On the other hand, if such an instruction has not been received in S226 ("no" for the judgment result), judges whether or not an instruction has been received for deciding on one selection from among the cover images by the user operating the operation input unit 32 in S228 and, if the decision instruction has been received ("yes" for the judgment), ends the album selection processing followed by going back to the previous processing. On the other hand, if the instruction has not been received ("no" for the judgment result), goes back to the S226 for repeating the above described processing.

Figure 17A:
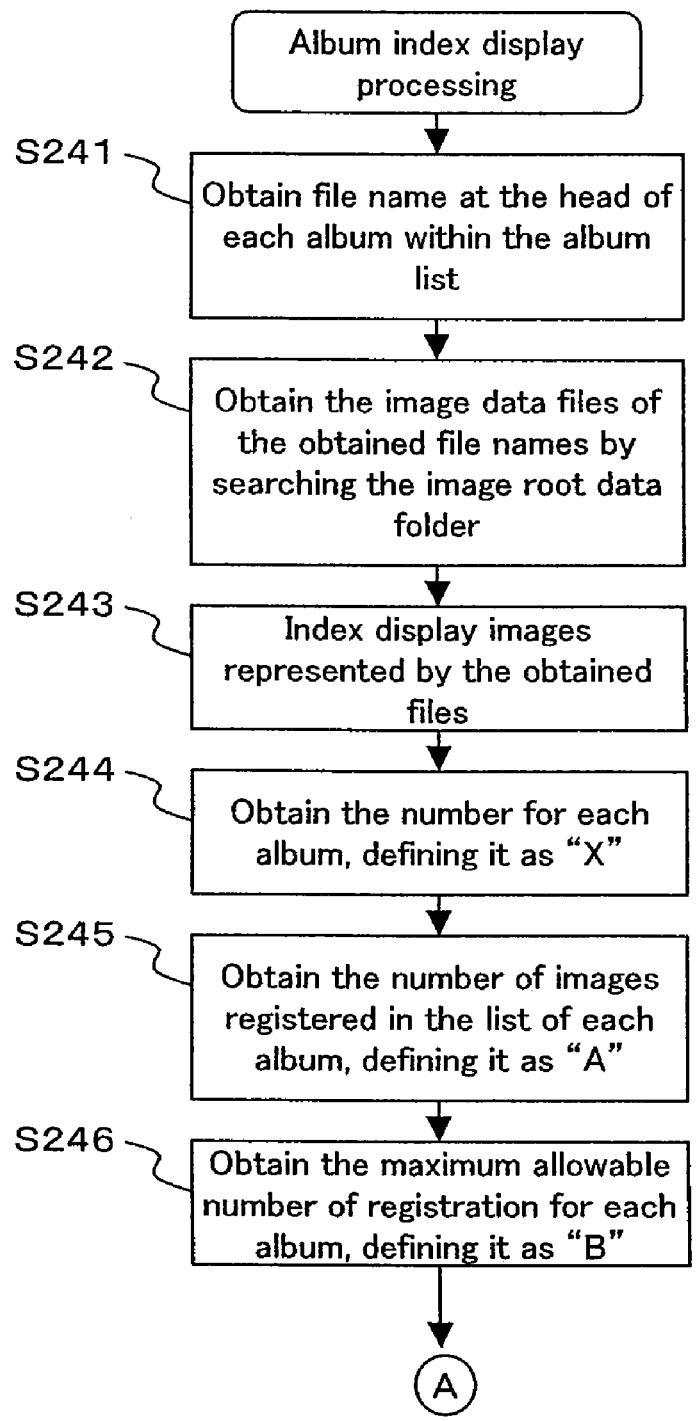
FIG. 17A is a flow chart showing processing content of album list display processing.
Figure 17B:
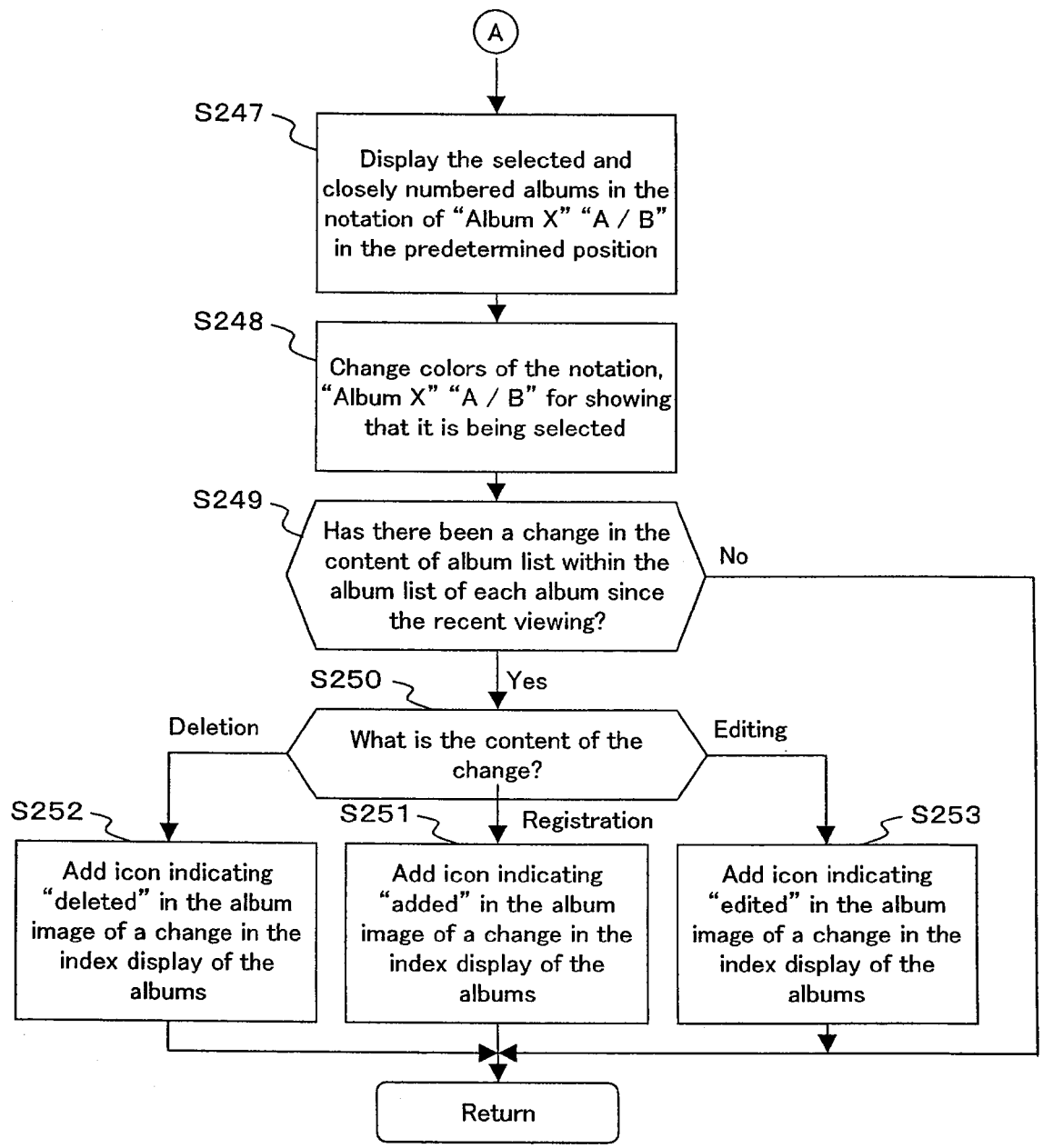
FIG. 17B is a flow chart showing processing content of album list display processing.

Incidentally, in S222, if the judgment is that an instruction from the user has been received for an index display of the cover images of albums, an index display for the albums will be done, whose process content is shown by FIGS. 17A and 17B.

Let it describe the process content of the album index display processing at this time.

First in S241 shown by FIG. 17A, the processing obtains the file name at the head of the list thereof for the image data file 14-*n* for each album within the album list 17. Incidentally, the file name at the head is for the image data file 14-*n* of the cover image of each album according to the processing of the S280 in the album transmission processing (refer to FIG. 11).

In S242, the processing obtains the image data files 14-*n*, which are the file names obtained by the processing in the previous step, by respectively searching in the image root folder 12 of the memory card 11.

In S243, the processing gives instructions to the image process unit 24 and the display process unit 27 to let the display unit 28 display the cover images respectively represented by the image data files 14-*n* obtained by the processing of the previous step, in a form of catalog display (i.e., index display), in which a selection frame encircling either one of the cover images displayed in the index display screen is also shown. The selection frame is for identifying a user selection of the cover images in the index display screen.

In S244, the processing obtains the number portion of the album names (i.e., "Album 1", "Album 2", "Album 3" and so on) given to the respective albums within the album list 17 to substitute for the variable X[i] (where i=1, 2, ...) one by one.

In S245, the processing counts the number of images in the each album within the album list 17 to substitute the counting result for the variable A(X[i]), respectively.

In S246, the processing figures out the maximum number of images allowed to be registered for each album within the album list 17 to substitute the obtained maximum number of images for the variable B(X[i]), respectively.

The processing, now proceeding to FIG. 17B and the S247, gives instructions to the image process unit 24 and the display process unit 27 so as to have the display unit 28 display the album names and values for the above described variables A(X[i]) and B(X[i]), in the notation of "Album X" and "A B", for the album corresponding to the cover image with the above described selection frame being displayed and for the albums whose album numbers are close to the aforementioned album on the right side of the index display.

In S248, the processing changes the display color of album display corresponding to the cover image with the above described selection frame being displayed among the displays shown by the processing of the previous step. Note that the style or size of the font, et cetera, may be changed, instead of the color in this processing.

In S249, the processing is to judge whether or not any change has been made to any of the list in each album within the album list 17 after the most recent album viewing and, if the judgment is that there has been a change ("yes" for the judgment), proceed to the S250; while, if no change has been made ("no" for the judgment), end the album index display processing, followed by going back to the original processing.

In S250, the processing is to identify the content of the change detected by the processing in the previous step. Here, if a file name of new image data file 14-*n* is identified to have been added to any of the album lists, proceed to S251. Or, if a file name of image data file 14-*n* is identified to have been deleted, proceed to S252. Or, if any editing other than a registration or deletion (e.g., change in the list sequence of image data file 14-*n*, et cetera) is identified to have been done to any of the album lists, proceed to S253.

In S251, the processing is to give instructions to the image process unit 24 and the display process unit 27 to have the icon for showing an image "added" (refer to FIG. 15F) superimposed on the album which has been additionally registered by a file name of image data file 14-*n* among the cover images shown by the currently displayed index display screen of the display unit 28, thus ending the album index display processing, followed by going back to the original processing.

In S252, the processing is to give instructions to the image process unit 24 and the display process unit 27 to have the icon for showing an image "deleted" (refer to FIG. 15G) superimposed on the album in which a file name of image data file 14-*n* has been deleted from the album list among the cover images shown by the currently displayed index display screen of the display unit 28, thus ending the album index display processing, followed by going back to the original processing.

In S253, the processing is to give instructions to the image process unit 24 and the display process unit 27 to have the icon for showing an image "edited" (refer to FIG. 15H) superimposed on the album in which any editing, other than registration or deletion, has been done among the cover images shown by the currently displayed index display screen of the display unit 28, thus ending the album index display processing, followed by going back to the original processing.

Such is the album index display processing.

The description now goes back to the processing after the album index display processing in S229 shown by FIG. 16.

In S230, the processing is to judge whether or not an instruction for changing a selection of the cover images in index display by the display unit 28 by the user operating the operation input unit 32 (that is, an instruction for moving the above described selection frame to another cover image) has been received and, if judged to have been received ("yes" for the judgment), proceed to S231, while if not received ("no" for the judgment), proceed to S233.

In S231, the processing is to give instructions to the image process unit 24 and the display process unit 27 to have the display unit 28 display the album names and values for the above described variables A(X[i]) and B(X[i]), in the notation of "Album X" and "A/B", for the album corresponding to the cover image with the above described selection frame being displayed anew and the albums whose album numbers are close to the aforementioned album on the right side of the index display.

In S232, the processing is to change display colors of the display of the album corresponding to the cover image with the selection frame being displayed among the display made by the processing in the previous step. Note that, also, in the processing of form, size, et cetera, of the font may be changed instead of changing the displayed colors.

In S233, the processing is to judge whether or not an instruction for deciding on one selection of the specified cover images by the user operating the operation input unit 32 has been received and, if the decision has been received ("yes" for the judgment), end the album selection processing, followed by going back to the original processing. On the other hand, if the decision has not been received ("no" for the judgment), go back to the S230 for repeating the above described processing.

Such is the album selection processing which makes the icon superimposed on the cover images in the index display as shown by FIG. 15.

Figure 18:
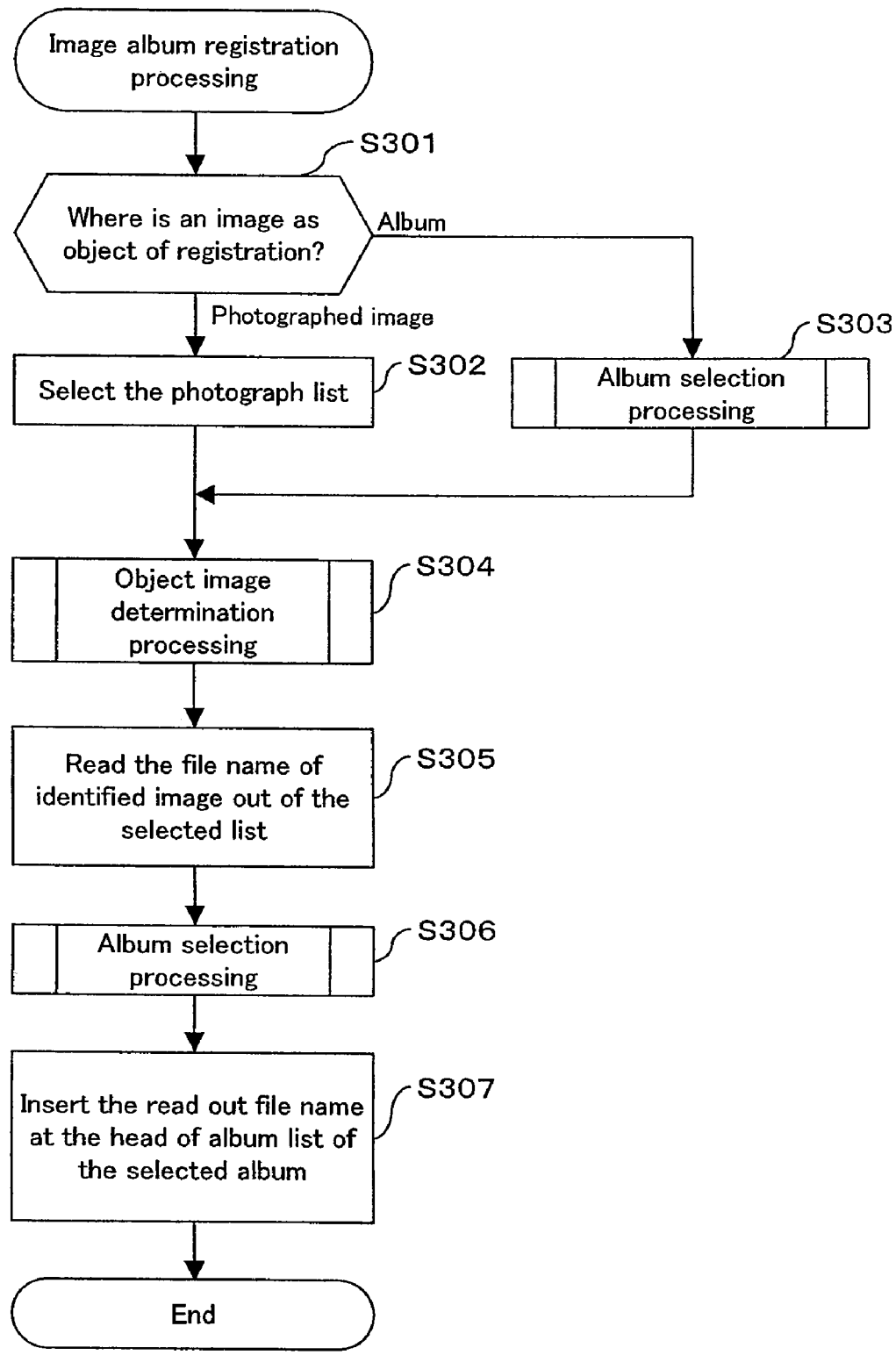
FIG. 18 is a flow chart showing processing content of image album registration processing.

The next description is about an image album registration processing shown by a flow chart of its content in FIG. 18. The processing is for registering a photographed image or an image contained in another album to the album as cover image.

The image album registration processing is initiated by the user operating the operation input unit 32 for instructing the aforementioned processing.

First in S301, the processing is to identify whereabouts of image as an object of additional registration relating to the instruction therefor and, if the instruction identifies a photographed image as the object of additional registration (e.g., the object of registration is identified as "P070" which is shown in the photograph list 16, but not in the album list 17), determine the photograph list 16 contained by the album list file 15 stored in the memory card 11 as the selection result in S302, followed by proceeding to the S304. On the other hand, if the instruction identifies an image contained by an album as the object of additional registration in S301, execute the above described album selection processing (refer to FIG. 16) in S303, resulting in selecting one of the albums shown by the album list 17 contained by the album list file 15.

In S304, it performs an object image identification processing which is for identifying a file name of image data file representing an image as the object of additional registration from among the file names of the image data files shown in the selected list. The detail of the processing will be described later.

In S305, the processing reads the file name of the image data file representing the image identified by the processing in the previous step out of either the photograph list 16 selected by the processing in S302 or the list of selected album by the album selection processing in S303 from among the album list 17.

In S306, the above described album selection processing (refer to FIG. 16) is executed anew to select one of the albums shown in the album list 17 contained by the album list file 15 as the result.

In S307, the processing is to insert the file name read out by the processing of S305 at the head of the list of albums (i.e., the sequence of file names of the image data files 14-*n*) selected by the album selection processing of S306 within the album list 17. By this processing, the image of the file name is additionally registered as the cover image of the album.

Incidentally, if the processing of S307 is followed by the above described album index display processing (refer to FIGS. 17A and 17B), the processing of S251 is executed as a result of S250 shown by FIG. 17B to superimpose the icon indicating "added" (refer to FIG. 15F) on the image of the index display screen of the album cover images.

A completion of S307 ends the image album registration processing.

Such is the image album registration processing which registers an additional image to the album and automatically sets the image as the cover image thereof.

Incidentally, the image represented by the image data file 14-*n* relating to the file name shown at the head of the list of each album within the album list 17 is displayed for replay in the display unit 28 by the processing of S212, S213 and S214 in the above described album replay processing. Meanwhile, in the above described image album registration processing, the file name of the cover image is registered at the head of the list of each album within the album list 17. Therefore, if an album replay processing is executed after the image album registration is done, the image newly added for registration (i.e., the cover image of the album) will be displayed first.

Figure 19:
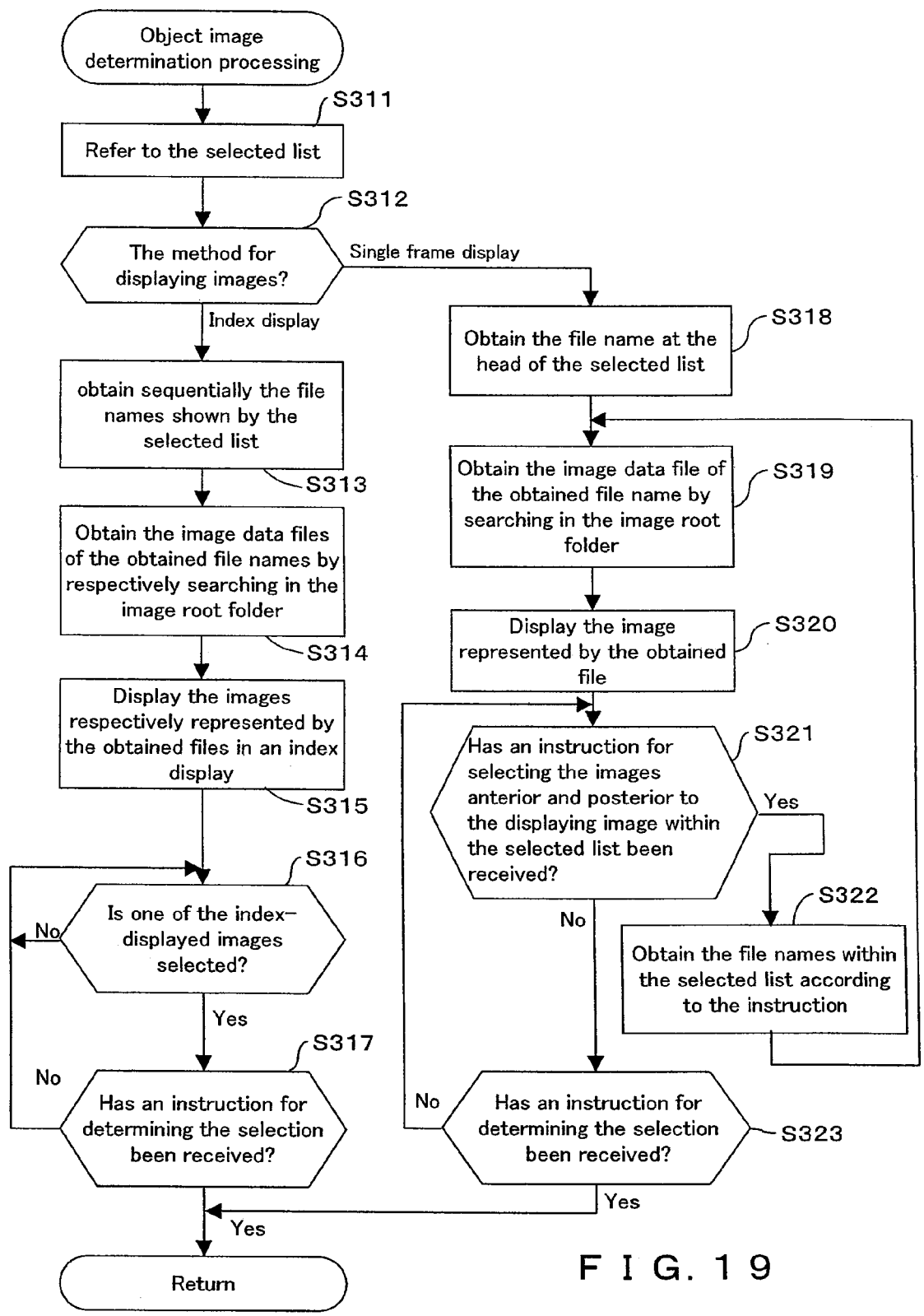
FIG. 19 is a flow chart showing processing content of object image determination processing.

The next description is about an object image determination processing which is the processing of the S304 in the above described image album registration processing. FIG. 19 is a flow chart showing a processing content of object image determination processing.

First in S311, the processing refers to either the photograph list 16 selected by the processing of S302 shown by FIG. 18 or a list of images in the album selected by the album selection processing of S303 shown by FIG. 18 out of the album list 17.

In S312, the processing refers to identify the content of instruction about a method for displaying images in the display unit 28 by the user operating the operation input unit 32. Here, if the instruction is for a catalog of a plurality of images (i.e., index display), proceeds to S313, while, if the content of the instruction is for displaying images one by one (i.e., single frame display), proceeds to S318.

In S313, the processing sequentially obtains the file names shown in the above described obtained list, and then obtains the image data files 14-n of the obtained file names by respectively searching in the image root folder 12 stored by the memory card 11 in S314.

In S315, the processing gives instructions to the image process unit 24 and the display process unit 27 to have the display unit 28 display the cover images expressed by the image data files 14-n obtained by the processing of the previous step.

In S316, the processing judges whether or not an instruction for selecting one of the images in the index display by the display unit 28 by the user operating the operation input unit 32 has been received. The processing of S316 will be repeated until the aforementioned instruction is received (until the judgment result becomes "yes").

In S317, the processing judges whether or not an instruction for determining the one selection from among the identified images by the user operating the operation input unit 32 has been received and, if the instruction is given ("yes" for the judgment), ends the object image determination processing, followed by going back to the original processing. On the other hand, if the instruction is not given ("no" for the judgment), goes back to S316 for repeating the above described processing.

In S318, the processing obtains the file name at the head of the sequence thereof shown in the above described selected list.

In S319, the processing obtains the image data files 14-n of the file names obtained by the processing executed immediately before by searching in the image root folder 12 stored in the memory card 11.

In S320, the processing gives instructions to the image process unit 24 and the display process unit 27 to have the display unit 28 display the cover images represented by the image data files 14-n obtained by the processing in the previous step.

In S321, the processing judges whether or not an instruction for selecting the images of the file names anterior and posterior to the file name of the image data file representing the image currently being displayed in the display part 28 within the above described obtained list by the user operating the operation input unit 32 has been received and, if the instruction is received ("yes" for the judgment), obtains the file names of sequences according to the instruction within the selected list in S322, followed by going back to S319 for repeating the above described processing.

On the other hand in S321, if such an instruction has not been received ("no" for the judgment), it judges whether or not an instruction for determining the selection of the image displayed by the display unit 28 has been received by the user operating the operation input unit 32 in S323 and, if the instruction for determining is received ("yes" for the judgment), ends the object image determination processing, followed by going back to the original processing. On the other hand, if the instruction for determining is not received ("no" for the judgment), it goes back to the S321 for repeating the above described processing.

Such is the object image determination processing.

The next description is about a method for deleting the image data files 14-n stored by the image root folder 12 in the memory card 11.

Figure 20A:
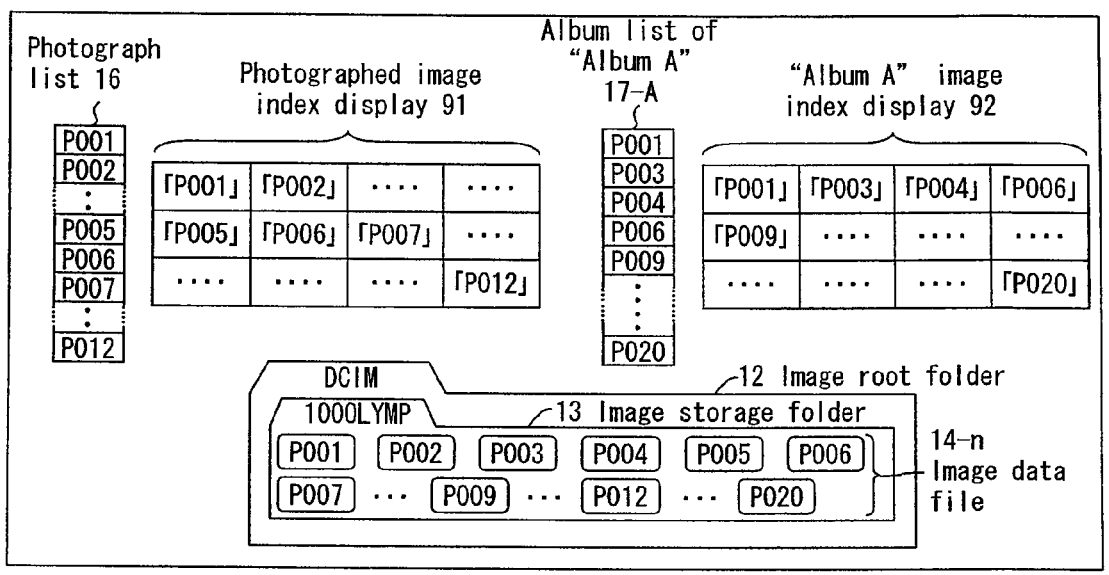
FIG. 20A exemplifies a storage state prior to deleting an image data file.
Figure 20C:
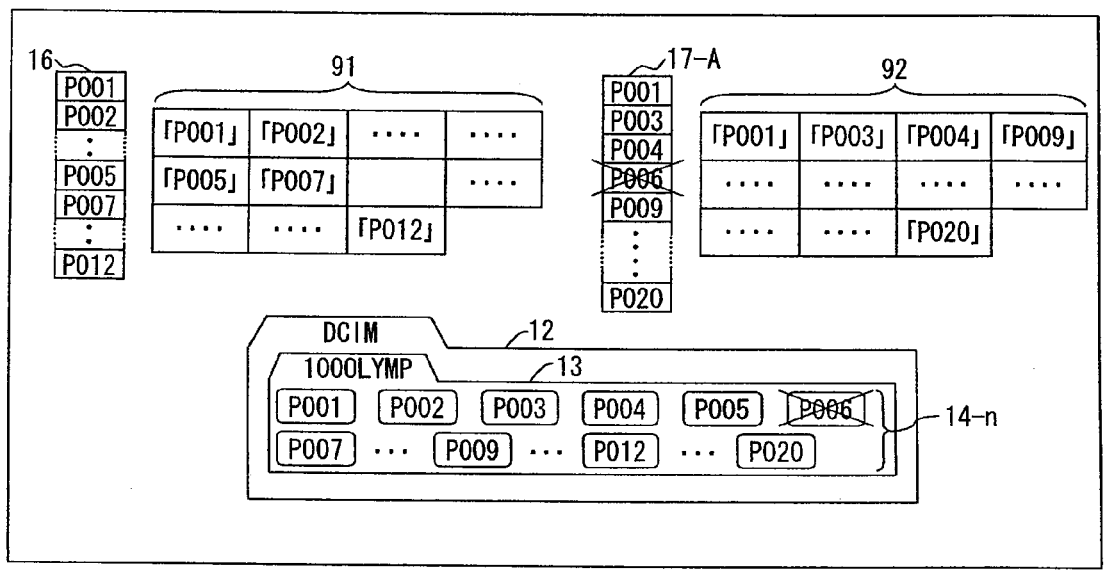
FIG. 20C shows a way of deleting the file name of a photographed image "006" from the album list vis-à-vis the storage state shown by FIG. 20B.

FIGS. 20A, 20B and 20C show the data content of the album list file 15 and the storage state of the image data files 14-n in the image root folder 12 both of which are stored in the memory card 11, and in addition, illustrate the display screens when the display unit 28 is made to display either the photographed images or the album images in the aforementioned storage state.

Each of FIGS. 20A, 20B and 20C, shows the content of the photograph list 16 as is, while the album list 17 as one thereof, i.e., "Album A", by naming the list thereof as "17-A". And the photographed image index display 91 shows the index display screen of the cover images displayed by the display unit 28 based on the list of the current photograph list 16, while the "Album A" image index display 92 shows the album image index display screen of the album images displayed by the display unit 28 based on the content of the list of the current "Album A" album list 17-A.

Let it be assumed that the camera 10 only has an album by the name of "Album A" in the example.

FIG. 20A exemplifies a storage state prior to deleting an image data file 14-n.

In the example shown by FIG. 20A, the sequence of file names of the image data files 14-n shown in the photograph list 16 is "P001, P002, . . . , P005, P006, P007, . . . , P012". In this case, the photographed image index display 91 is a catalog of images represented by the image data files 14-n which are assigned by these file names. And in this example, the sequence of file names of the image data files 14-n shown in the album list 17-A of "Album A" is "P001, P003, P004, P006, P009, . . . , P020". In this case, "Album A" image index display 92 is a catalog of images represented by the image data files 14-n which are assigned by these file names. At this point, the image data files 14-n assigned by the file names "P001, P002, P003, P004, P005, P006, P007, . . . , P009, . . . P012" are stored by the image storage folder 13 within the image root folder 12.

The state of FIG. 20B shows after a data operation is done for the data within the memory card 11 according to an instruction for deleting the photographed image "006" by the user of the camera 10, starting from the state of FIG. 20A.

In the transition from FIGS. 20A to 20B, the file name of "006" is deleted from the photograph list 16. Therefore, the photographed image of "P006" is deleted from the photograph list 16. In FIG. 20A, however, "P006" is also contained in the album list 17-A of "Album A" as album image, therefore the image data file 14-n representing "P006" is not deleted from the image root folder 12 then. Therefore, it is still possible to display the image of "P006" and in fact the image of "P006" is displayed in the "Album A" image index display 92.

Subsequently, the state of FIG. 20C shows after a data operation is done for the data within the memory card 11 according to an instruction for deleting the album image of "P006" by the user of the camera 10, starting from the state of FIG. 20B.

In the transition from FIGS. 20B to 20C, the file name of "P006" is also deleted from the album list 17-A of "Album A". Therefore, the album image of "P006" is deleted also from the "Album A" image index display 92. As a result, the file name of "P006" disappears from both the photograph list 16 and album list 17-A of "Album A". Then the image data file 14-n for "P006" is deleted from the image root folder 12.

As described so far, it is possible to delete an image data file 14-n properly when the same image is included in a plurality of lists by deleting the image data file 14-n having the same file name after the file name disappears from both of the photograph list 16 and the album list 17.

The following description is about the processing to be performed by the CPU 30 in order to make the camera 10 capable of the method for deleting the above described image data files 14-n.

Figure 21:
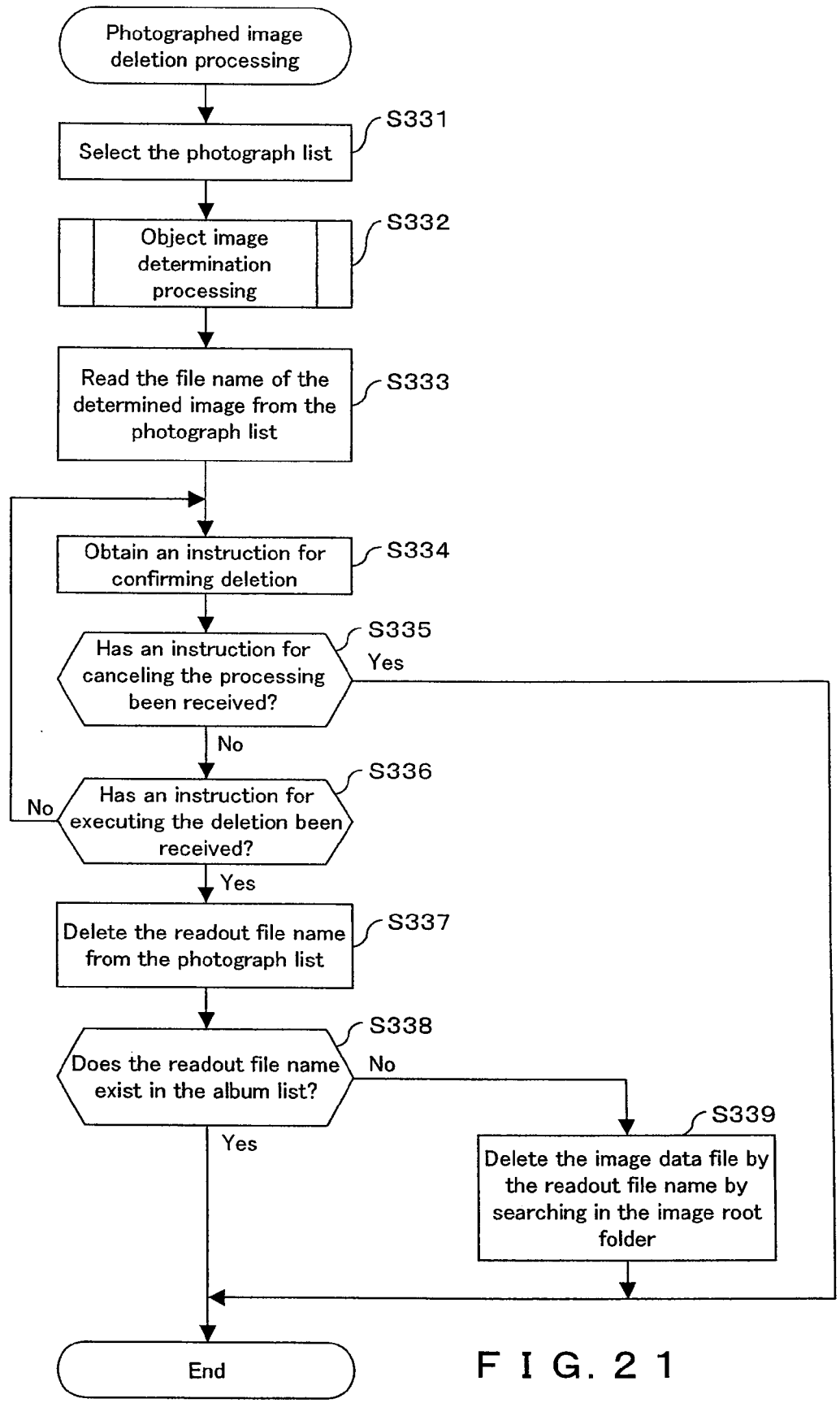
FIG. 21 is a flow chart showing processing content of photographed image deletion processing.

First description deals with FIG. 21 which is a flow chart showing a processing content of photographed image deletion processing that is to delete the file name of the photographed image relating to a user instruction from the photograph list 16, and also delete the image data file 14-n with the aforementioned file name only if the file name is not shown in the album list 17, both at the time of receiving such an instruction from the user. That is, this processing makes it possible to delete an image data file properly even if the photographed image relating to the instruction for deleting it obtained from the user is contained in an album as album image.

Incidentally, the processing is initiated by the user operating the operation input unit 32 for giving instruction for deleting a photographed image.

First in S331, the processing selects the photograph list 16 from the album list file 15 stored in the memory card 11, and executes the above described object image determination processing (refer to FIG. 19) to determine a photographed image as the object of deletion in S332.

In S333, the processing reads the file name of the photographed image determined by the processing in the previous step out of the photograph list 16.

In S334, the processing obtains an instruction for confirmation of deleting the photographed image by the user operating the operation input unit 32, followed by judging whether or not the instruction is a cancellation of the deletion in the subsequent step of S335. Here, if the judgment result is "yes", ends the photographed image deletion processing; while, if the judgment result is "no", judges whether or not the instruction is for execution of deletion in S336 and, if the judgment result is "yes", the processing proceeds to the S 337, whereas, if no, then goes back to the S334 for repeating the above described processing.

In S337, the processing deletes the file name read out by the processing of S333 to delete it from the photograph list 16.

In the meantime, if the processing of S337 is followed by the above described album index display processing (refer to FIGS. 17A and 17B), the processing of S252 is executed by the judgment of S250 shown by FIG. 17B to superimpose the icon expressing "deleted" image (refer to FIG. 15G) on the index display of the representative images of albums.

In S338, the processing judges whether or not the file name read out of the photograph list 16 by the processing of S333 exists in the list of file names of the image data files 14-n for the each album in the album list 17 contained by the album list file 15 and, if the aforementioned file name exists in the album list 17 ("yes" for the judgment), ends the photographed image deletion processing as is. On the other hand, if the aforementioned file name does not exist in the album list 17 ("no" for the judgment), deletes the image data file 14-n with the aforementioned file name by finding it out of the image root folder 12 in S339.

Such is the photographed image deletion processing.

The next description is about FIG. 22 which is a flow chart showing a processing content of album image deletion processing that is to delete the file name of album image relating to an instruction of the user from the album list 17, and also an image data file 14-n with the aforementioned file name from the image root folder 12 only if the aforementioned file name is not shown either in the photograph list 16 or the album list 17, both at the time of receiving the instruction for deleting the album image by the user. That is, this processing makes it possible to delete an image data file properly, even if the album image relating to the user instruction for deletion is a photographed image or an album image contained by another album as well.

The album image deletion processing is initiated by the user operating the operation input unit 32 to make the display unit 28 display the function selection screen relating to the album operation as exemplified by FIG. 23A and further operating the operation input unit 32 to select the function of "cancel registration".

First in S341, the processing selects the album containing the album image as the object of deletion as a result of executing the above described album selection processing (refer to FIG. 16).

Figure 23C:
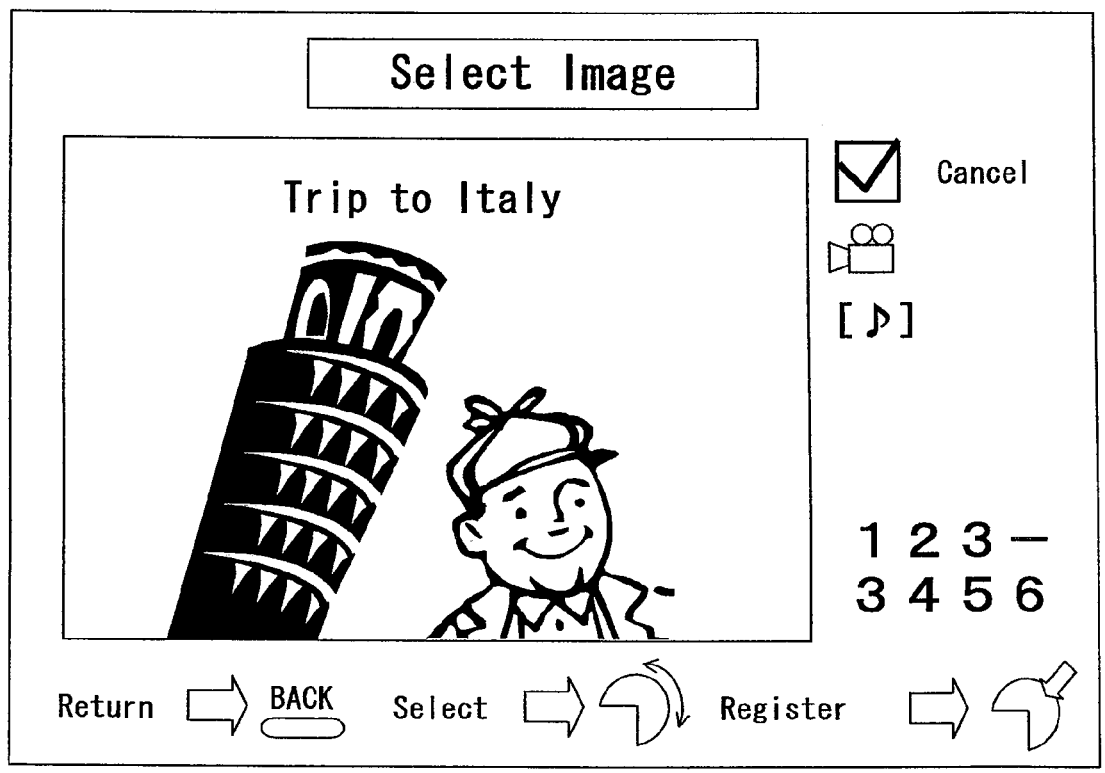
FIG. 23C exemplifies a single frame display of images contained by an album.

In the subsequent step S342, it determines the photographed image as the object of deletion as a result of executing the above described object image determination processing (refer to FIG. 19). FIG. 23B exemplifies a screen of catalog display of album images displayed by the display unit 28 on the camera 10 by the processing of S315 in the object image determination processing; while FIG. 23C exemplifies a screen of single frame display of album images displayed by the display unit 28 by the processing of S320.

In S343, the processing reads the file name of album image determined by the processing of the previous step, out of the list of albums selected by the processing of S341 within the album list 17.

In S344, the processing obtains an instruction for confirmation of deleting the album image by the user operating the operation input unit 32, followed by judging whether or not the instruction indicates a cancellation of the deletion processing in the following step S345 and, if the judgment result is "yes", ends the album image deletion processing immediately. On the other hand, if the judgment result is "no", it judges whether or not the instruction is for executing the deletion in S346 and, if the judgment result is "yes", proceeds to S347, while, if "no", goes back to the processing of S344 for repeating the above described processing.

Figure 23D:
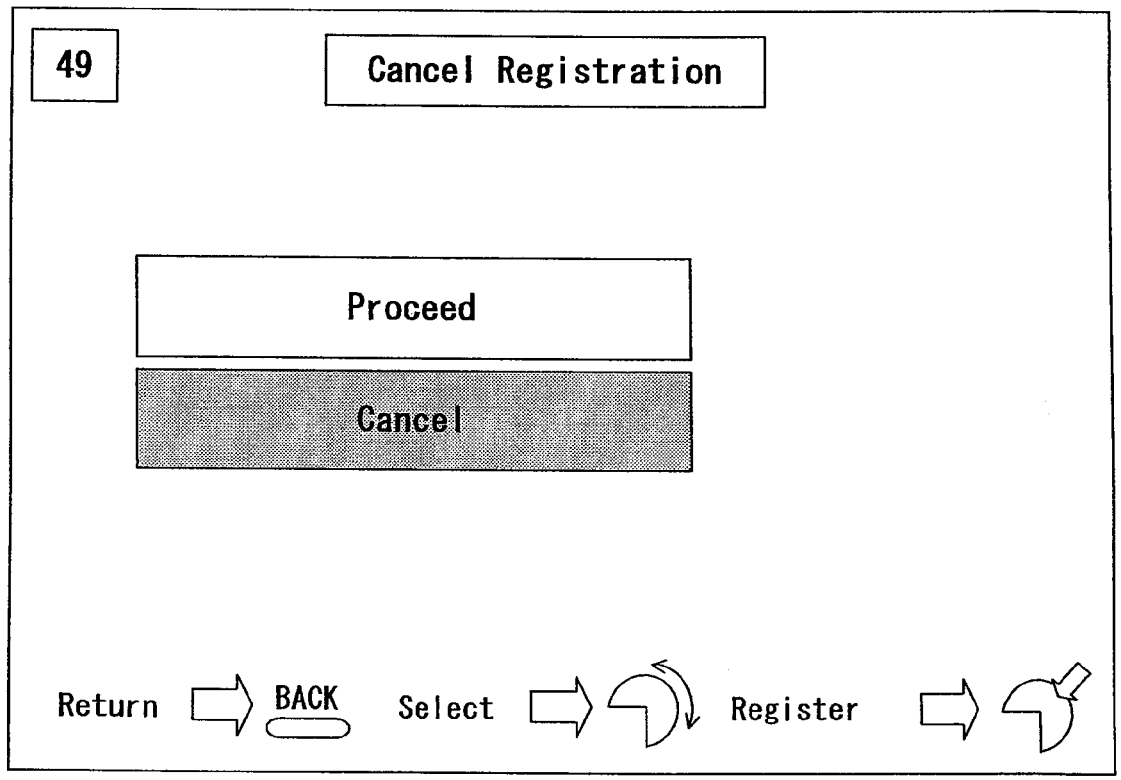
FIG. 23D exemplifies a screen for instructing a cancellation of deletion processing of image contained by an album.

FIG. 23D exemplifies a screen for making the display unit 28 display an instruction for canceling a deletion processing of album image; and FIG. 23E exemplifies a screen for making the display unit 28 display an instruction for deleting album image, both relating to the processing of the above described processing in S344.

In S347, the processing deletes the readout file name by the processing of S343 from the list of file names for the album selected by the processing of S341 within the album list 17.

In S348, the processing judges whether or not the file name readout of the album list 17 by the processing of S343 still exists in the list of file names of the image data files 14-n for each within the album list 17 and, if at least one of the same file name exists in the album list 17 ("yes" for the judgment), ends the album image deletion processing as is. On the other hand, if none of the aforementioned file names exist in the album list 17 ("no" for the judgment), it proceeds to S349.

In S349, the processing judges whether or not the file name readout of the album list 17 by the processing of S343 exists in the photograph list 16 and, if the aforementioned file name exists ("yes" for the judgment), ends the album image deletion processing as is. On the other hand, if the file name does not exist in the photograph list 16 ("no" for the judgment), deletes the image data file 14-n with the file name by searching it in the image root file 12 in S350. Upon finishing the processing of S350, ends the album image deletion processing.

Such is the album image deletion processing.

Note that the file name of an image data file 14-n representing a photographed image is added only to the photograph list 16 of the album list file 15 when the camera 10 photographs in the above described embodiment. Instead, the file name may be inserted to the head of the list of file names for a certain album among the one in the album list 17 of the album list file 15 so as to complete the registration of photographed image to the album and the setting of cover image at the time of photographing.

Meanwhile, the album operation processing (refer to FIGS. 4 and 5), the cover image creation processing (refer to FIG. 7), the title superimposing processing (refer to FIG. 9) and the album transmission processing (refer to FIG. 11) are respectively done by the CPU 51 comprised by the PC 40, however, the whole or a part of these processing may be done by the CPU 30 comprised by the camera 10 so as to enable the camera 10 to perform an addition or deletion of image to the album, superimposing title to the cover images and creation of album list file 15 independently.

Also contrarily, the whole or a part of the album replay processing (refer to FIG. 13), album selection processing (refer to FIG. 16), album index display processing (refer to FIGS. 17A and 17B), album registration processing (refer to FIG. 18), object image determination processing (refer to FIG. 19) and album image deletion processing (refer to FIG. 22) done by the CPU 30 comprised by the camera 10 may be done by the CPU 51 comprised by the PC 40 executing the control program so as to enable the PC 40 to perform a catalog display of the cover image of each album (i.e., index display), a renewal of the album list 17, an additional registration and automatic setting of cover image for each album, a deletion of image from the album, and a superimposing of icon on the index display of cover images for notifying a change in the applicable album independently, thereby embodying the present invention by the PC 40. Furthermore, the present invention may be embodied by a mobile phone, a PDA (Personal Digital Assistant), et cetera for instance, in addition to the camera 10 and the PC 40, as an information management apparatus according to the present invention.

Meanwhile, the above described embodiment superimposes a graphic symbol (i.e., icon) on the applicable cover image in order to notify the user of a change made to the album, the notification, however, may be done by a character or sound, or through a change in form or color of the applicable cover image.

In the meantime, the present invention is not limited by the above described embodiment, but rather is possible to improve or modify in various ways within the scope of concept according to the present invention.

What is claimed is:

1. An information management apparatus defining a replay sequence of new image data added to a group of images to which a plurality of image data belong, comprising:
    a storage unit for storing group information relating to a group to which image data belongs and replay sequence information indicating a replay sequence at the time of replaying image data belonging to the aforementioned group;
    a designation unit for designating a group for new image data which does not belong to the group;
    an information renewal unit for rewriting the replay sequence information so as to replay the new image data first from among the specific group when the designation unit designates a group for the new image data belonging to; and
    a notification unit for notifying a group in which the replay sequence information is rewritten so as to replay the new image data first from among the specific group,
    wherein the notification unit includes an index display part for displaying image data extracted singularly from said each group by an index screen display as representative images of respective groups so as to show an icon superimposed on the representative image of a renewed group for meaning a predetermined operation having been done thereto in the index screen display.

2. The information management apparatus according to claim 1, wherein
    the group information and the replay sequence information are stored by the storage unit as a management file containing the group information and the reply sequence information.

3. The information management apparatus according to claim 1, wherein
    the information renewal unit renews information also at the time of group information relating to image data being deleted from the group.

4. An information management method defining a replay sequence of new image data added to a group of images to which a plurality of image data belong, comprising:
    having a memory memorize group information relating to a group to which image data belongs and replay sequence information indicating a replay sequence at the time of replaying image data belonging to the aforementioned group;
    displaying image data extracted singularly from each group by an index screen display as representative images of respective groups;
    designating a group for new image data which does not belong to the group;
    rewriting the replay sequence information so as to replay the new image data first from among the specific group when the designation unit designates a group for the new image data belonging to; and
    notifying a group in which the replay sequence information is rewritten by showing an icon superimposed on the representative image of the renewed group for meaning a predetermined operation having been done thereto in the index screen display when the replay sequence information is rewritten so as to replay the new image data first from among the specific group.

5. A computer readable recording medium for storing a program for making a computer perform an information management defining a replay sequence of new image data added to a group of images to which a plurality of image data belong, wherein the program makes the computer perform the processing of
- having a memory memorize group information relating to a group to which image data belongs and replay sequence information indicating a replay sequence at the time of replaying image data belonging to the aforementioned group;
- displaying image data extracted singularly from each group by an index screen display as representative images of respective groups;
- designating a group for new image data which does not belong to the group;
- rewriting the replay sequence information so as to reply the new image data first from among the specification group when the designation unit designates a group for the new image data belonging to; and
- notifying a group in which the replay sequence information is rewritten by showing an icon superimposed on the representative image of the renewed group for meaning a predetermined operation having been done thereto in the index screen display when the replay sequence information is rewritten so as to replay the new image data first from among the specific group.

* * * * *